United States Patent
Hidaka

(10) Patent No.: US 8,213,494 B2
(45) Date of Patent: *Jul. 3, 2012

(54) SIGN-BASED GENERAL ZERO-FORCING ADAPTIVE EQUALIZER CONTROL

(75) Inventor: Yasuo Hidaka, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 456 days.

This patent is subject to a terminal disclaimer.

(21) Appl. No.: 12/489,356

(22) Filed: Jun. 22, 2009

(65) Prior Publication Data

US 2009/0316771 A1 Dec. 24, 2009

Related U.S. Application Data

(60) Provisional application No. 61/074,182, filed on Jun. 20, 2008.

(51) Int. Cl.
*H04L 27/10* (2006.01)
(52) U.S. Cl. ..... 375/233; 375/349; 375/348; 455/226.1; 455/134; 455/135; 455/306; 708/323
(58) Field of Classification Search ............... 375/349, 375/348, 233; 455/226.1, 134, 135, 136; 708/323
See application file for complete search history.

(56) References Cited

U.S. PATENT DOCUMENTS

| | | | |
|---|---|---|---|
| 4,328,585 A * | 5/1982 | Monsen | 375/233 |
| 4,730,343 A | 3/1988 | Kanemasa | |
| 6,111,431 A | 8/2000 | Estrada | |
| 6,177,951 B1 | 1/2001 | Ghosh | |
| 6,262,606 B1 | 7/2001 | Tamjidi | |
| 6,313,662 B1 | 11/2001 | Ide | |
| 6,341,360 B1 | 1/2002 | Abdelilah | |
| 6,353,334 B1 | 3/2002 | Schultz | |
| 6,370,190 B1 | 4/2002 | Young | |
| 6,388,477 B1 | 5/2002 | Juang | |
| 6,911,841 B2 | 6/2005 | Lee | |
| 6,930,506 B2 | 8/2005 | Cranford, Jr. | |
| 6,990,644 B2 | 1/2006 | Feng | |
| 6,992,508 B2 | 1/2006 | Chow | |

(Continued)

OTHER PUBLICATIONS

Ng et al., "Low Power Gbit/sec Low Voltage Differential Signaling I/O System," Electrical Engineering and Computer Science, University of California, Berkeley, http://www.ocf.berkeley.edu/~eng/classes/241Report.pdf; Jun. 29, 2006.

(Continued)

*Primary Examiner* — Eva Puente
*Assistant Examiner* — Rahel Guarino
(74) *Attorney, Agent, or Firm* — Baker Botts L.L.P.

(57) ABSTRACT

In one embodiment, a system includes one or more digital feedback equalizers (DFEs) that include one or more residual intersymbol interference (ISI) detectors, one or more column balancers, and one or more weight selectors. The residual ISI detectors produce a first output signal indicating whether the residual ISI of a received input signal has a positive sign or a negative sign. The column balancers select one of the first output signals to produce a second output signal. The weight selectors access one of the weight values. The weight value corresponds to the column balancer that produced the second output signal and the residual ISI detector that produced the first output signal, and has a magnitude that is substantially independent of the sign of the residual ISI. The weight selectors produce a third output signal based on the weight value and the sign of the residual ISI.

19 Claims, 20 Drawing Sheets

U.S. PATENT DOCUMENTS

| | | |
|---|---|---|
| 7,135,887 B1 | 11/2006 | Shumarayev |
| 7,138,727 B2 | 11/2006 | Hein |
| 7,236,013 B2 | 6/2007 | Kasanyai |
| 7,268,623 B2 | 9/2007 | Kim |
| 7,301,371 B2 | 11/2007 | Kim |
| 7,313,182 B2 | 12/2007 | Fimoff |
| 7,427,878 B2 | 9/2008 | Jiang |
| 7,576,567 B2 | 8/2009 | Jiang |
| 7,579,872 B2 | 8/2009 | Jiang |
| 2003/0189998 A1* | 10/2003 | Phanse et al. .......... 375/348 |
| 2003/0223489 A1* | 12/2003 | Smee et al. .......... 375/233 |
| 2004/0151239 A1 | 8/2004 | Koyanagi et al. |
| 2004/0151240 A1 | 8/2004 | Hidaka |
| 2004/0151268 A1 | 8/2004 | Hidaka |
| 2004/0153898 A1 | 8/2004 | Hidaka |
| 2004/0155643 A1 | 8/2004 | Hidaka |
| 2004/0156432 A1 | 8/2004 | Hidaka |
| 2004/0233976 A1 | 11/2004 | Han |
| 2004/0257127 A1 | 12/2004 | Levin |
| 2004/0264562 A1 | 12/2004 | Wu |
| 2005/0047500 A1 | 3/2005 | Gupta et al. |
| 2005/0135471 A1 | 6/2005 | Tonietto |
| 2005/0184801 A1 | 8/2005 | Gai et al. |
| 2005/0185710 A1 | 8/2005 | Gai et al. |
| 2005/0226355 A1 | 10/2005 | Kibune et al. |
| 2005/0238092 A1 | 10/2005 | Ng |
| 2005/0254565 A1 | 11/2005 | Sivadas et al. |
| 2006/0291457 A1 | 12/2006 | Hidaka |
| 2007/0110147 A1 | 5/2007 | Koyanagi |
| 2007/0195874 A1 | 8/2007 | Aziz |
| 2007/0280341 A1 | 12/2007 | Hidaka |
| 2007/0280342 A1 | 12/2007 | Hidaka |
| 2007/0280383 A1 | 12/2007 | Hidaka |
| 2007/0280384 A1 | 12/2007 | Hidaka |
| 2007/0280389 A1 | 12/2007 | Hidaka |
| 2007/0280390 A1 | 12/2007 | Hidaka |
| 2007/0280391 A1 | 12/2007 | Hidaka |
| 2007/0297209 A1 | 12/2007 | Hidaka |
| 2007/0297248 A1 | 12/2007 | Hidaka |
| 2007/0300119 A1 | 12/2007 | Hidaka |
| 2008/0056344 A1 | 3/2008 | Hidaka |
| 2008/0143326 A1 | 6/2008 | Voisine |
| 2008/0198916 A1 | 8/2008 | Zeng |
| 2009/0086809 A1 | 4/2009 | Hidaka |
| 2009/0086810 A1 | 4/2009 | Hidaka |
| 2009/0086989 A1 | 4/2009 | Hidaka |
| 2009/0140778 A1 | 6/2009 | Kikuchi |
| 2009/0316767 A1 | 12/2009 | Hidaka |
| 2009/0316769 A1 | 12/2009 | Hidaka |
| 2009/0316770 A1 | 12/2009 | Hidaka |
| 2009/0316772 A1 | 12/2009 | Hidaka |

OTHER PUBLICATIONS

Office Action for U.S. Appl. No. 12/488790, Jul. 22, 2010.
Troy Beukema, et al: "A 6.4-Gb/s CMOS SerDes Core with Feed-Forward and Decision-Feedback Equalization," IEEE Journal of Solid-State Circuits, vol. 40, No. 12, pp. 2633-2645, Dec. 2005.
Robert Payne, et al: "A 6.25-Gb/s binary transceiver in 0.13-um CMOS for Serial Data Transmission Across High Loss Legacy Backplane Channels," IEEE Journal of Solid-State Circuits, vol. 40, No. 12, pp. 2646-2657, Dec. 2005.
Song Wu, et al: "Design of a 6.25 Gbps Backplane SerDes with TOP-down Design Methodology," Proceedings of DesignCon 2004, 11-TA1, Santa Clara, CA, Feb. 2004.
Office Action for U.S. Appl. No. 13/489,348, Dec. 16, 2011.
Office Action for U.S. Appl. No. 13/488,777, Dec. 23, 2011.
Office Action for U.S. Appl. No. 12/489,370, Nov. 25, 2011.

* cited by examiner

DATA VALUE:

BOUNDARY VALUE: $E_{4.5}$

| DATA PATTERN | $D_0$ | $D_1$ | $D_2$ | $D_3$ | $D_4$ | $D_5$ | $D_6$ | $E_{4.5}$ | $h_{+1.5}$ |
|---|---|---|---|---|---|---|---|---|---|
| DATA PATTERN H | | | | +1 | | | | +1 | POSITIVE |
| | -1 | -1 | +1 | | -1 | +1 | -1 | -1 | NEGATIVE |
| DATA PATTERN L | | | | -1 | | | | +1 | NEGATIVE |
| | | | | | | | | -1 | POSITIVE |

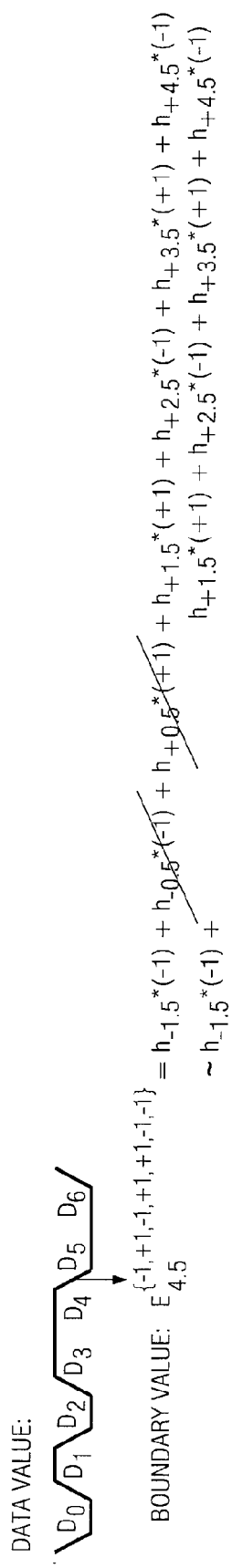

DATA VALUE: $D_0, D_1, D_2, D_3, D_4, D_5, D_6$ {−1,+1,−1,+1,+1,−1,−1}

BOUNDARY VALUE: $E_{4.5}$ $E_{4.5} = h_{-1.5}*(-1) + h_{-0.5}*(-1) + h_{+0.5}*(+1) + h_{+1.5}*(+1) + h_{+2.5}*(-1) + h_{+3.5}*(+1) + h_{+4.5}*(-1)$
$= -h_{-1.5} + h_{-1.5} - h_{+2.5} + h_{+3.5} - h_{+4.5}$
$\sim -h_{-1.5} + h_{-1.5} - h_{+2.5} + h_{+3.5} - h_{+4.5}$
$\sim -h_{-1.5} +$ ... $+ h_{+1.5}*(+1) + h_{+2.5}*(-1) + h_{+3.5}*(+1) + h_{+4.5}*(-1)$

| DATA PATTERN | $D_0$ | $D_1$ | $D_2$ | $D_3$ | $D_4$ | $D_5$ | $D_6$ | $E_{4.5}$ |
|---|---|---|---|---|---|---|---|---|
| DATA PATTERN H | −1 | +1 | −1 | +1 | +1 | −1 | −1 | +1 |
|  |  |  |  |  |  |  |  | −1 |

POSITIVE
NEGATIVE

*FIG. 14*

| PATTERN SET | DATA PATTERN | $D_0$ | $D_1$ | $D_2$ | $D_3$ | $D_4$ | $D_5$ | $D_6$ | $E_{4.5}$ | $h_{+2.5}$ |
|---|---|---|---|---|---|---|---|---|---|---|
| PATTERN SET R | DATA PATTERN H | +1 | +1 | +1 |  |  |  |  | +1 | POSITIVE |
|  |  |  |  |  |  |  |  |  | −1 | NEGATIVE |
|  | DATA PATTERN L | −1 | −1 |  |  |  |  |  | +1 | NEGATIVE |
|  |  |  |  |  |  |  |  |  | −1 | POSITIVE |
| PATTERN SET F | DATA PATTERN H |  | +1 | +1 | +1 |  |  |  | +1 | POSITIVE |
|  |  |  |  |  |  |  |  |  | −1 | NEGATIVE |
|  | DATA PATTERN L |  | −1 | −1 | −1 |  |  |  | +1 | NEGATIVE |
|  |  |  |  |  |  |  |  |  | −1 | POSITIVE |

*FIG. 15*

SIGN-BASED GENERAL ZERO-FORCING ADAPTIVE EQUALIZER CONTROL

RELATED APPLICATION

This application claims the benefit, under 35 U.S.C. §119 (e), of U.S. Provisional Patent Application No. 61/074,182, entitled System and Method For Equalizer Control, filed 20 Jun. 2008, which is incorporated herein by reference.

TECHNICAL FIELD

This disclosure relates generally to electrical communication.

BACKGROUND

A transmission channel may distort high-frequency (HF) signals communicated through it. The distortion may be a result of frequency-dependent signal attenuation caused, for example, by skin effect or dielectric effect in the transmission channel and may vary according to one or more characteristics of the transmission channel, such as a length or an insulator material of the transmission channel. To compensate for the distortion, a transmitter transmitting signals through the transmission channel may include a pre-emphasis driver. A receiver receiving the signals through the transmission channel may include one or more equalizers.

BRIEF DESCRIPTION OF THE DRAWINGS

FIG. 14 illustrates example aggregate detection of multiple components of residual boundary ISI using one data sequence.

FIG. 15 illustrates example sets of data sequences for detecting residual boundary ISI.

DESCRIPTION OF EXAMPLE EMBODIMENTS

Figure 1:
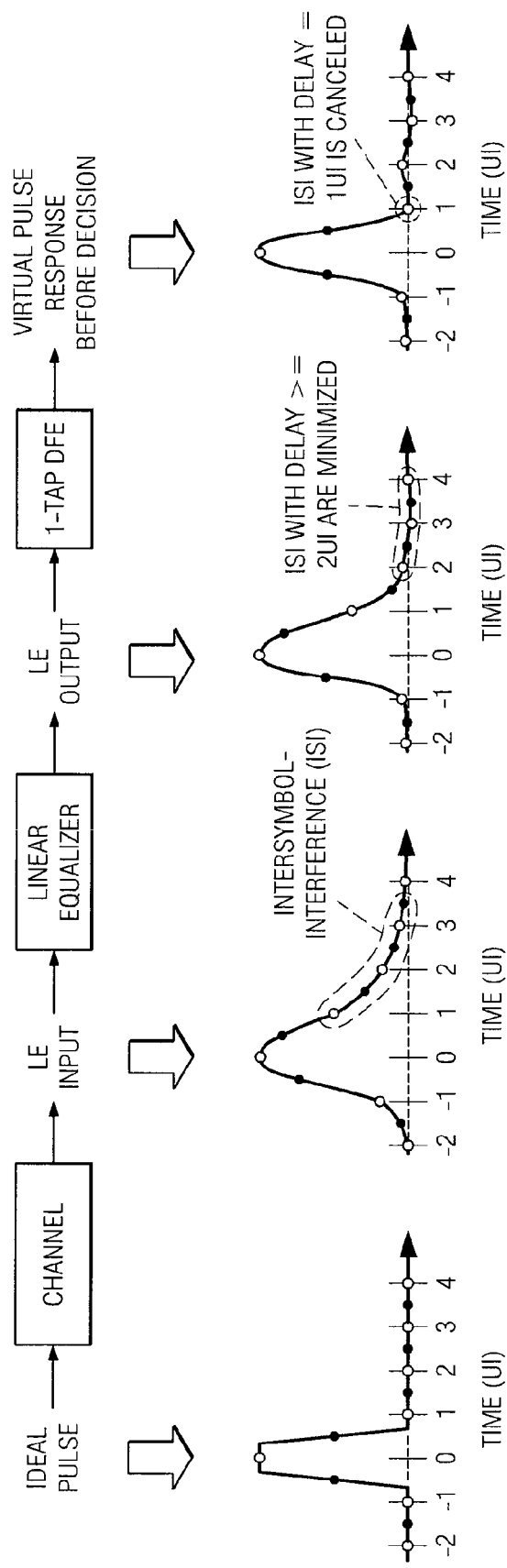
FIG. 1 illustrates example pulse responses of an example transmission channel, an example linear equalizer (LE), and an example DFE.

FIG. 1 illustrates example pulse responses of an example transmission channel, an example LE, and an example DFE. The transmission channel communicates a signal from a transmitter to a receiver that includes the LE and the DFE, which process the received signal. The LE and DFE may communicate the processed signal in any suitable manner to a decision circuit or any other circuit components. After transmission over the channel, the received signal (or pulse) has a long tail due to high-frequency loss in the transmission channel. The long tail causes ISI because the long tail interferes with successively transmitted symbols. In particular embodiments, there may be two symbols: such as 0 and 1 or −1 and +1. The present disclosure contemplates any suitable symbols. In FIG. 1, the LE moderately amplifies an attenuated high-frequency component of the received signal to reduce residual ISI occurring after a particular delay. If the DFE after the LE is a 1-tap DFE, the LE may reduce residual ISI occurring after a delay of 2.0 unit intervals (UIs), as FIG. 1 illustrates. The DFE cancels the residual ISI occurring more immediately after the pulse. If the DFE is a 1-tap DFE (as in FIG. 1) the DFE may use a feedback loop from a decision circuit in the DFE to cancel residual ISI occurring after a delay of 1.0 UI. In particular embodiments, the LE and 1-tap DFE may apply compensation as illustrated in FIG. 1 that minimizes and cancels residual ISI occurring after particular unit intervals of delay. In particular embodiments, the LE and 1-tap DFE may reduce residual ISI occurring after particular unit intervals of delay.

The receiver may include any suitable equalizer or combination of equalizers for receiving, at an input port, the signal from the transmitter and applying a gain, offset, or other modification to the signal according to parameters that specify an amount of compensation to apply to the signal. Such parameters may be adaptive, which may be desirable when one or more characteristics of the transmission channel are unknown. The receiver may also include equalizer-control logic for adjusting such parameters. U.S. Patent Application Publication No. 2007/0280383, entitled System and Method for Adjusting Compensation Applied to a Signal and published 6 Dec. 2007, which is incorporated herein by reference, further describes adjusting equalizer parameters to compensate for signal distortion. One or more of the equalizers in the receiver may utilize a feedback signal, applying the feedback signal to the signal from the transmitter to compensate for distortion in the signal. The present disclosure may refer to circuit components applying compensation for distortion in a signal as being part of an adaptive equalizer or an adaptive equalizer control system. Herein, reference to an adaptive equalizer may encompass an adaptive equalizer control system, and vice versa, where appropriate. For example, in FIG. 1, an adaptive equalizer control system includes an LE and a DFE to provide two-dimensional adaptive equalizer control.

An adaptive equalizer control system may include an LE to reduce residual ISI with greater than or equal to approximately 2.0 UIs of delay. If an LE applies too little amplification, the pulse response may include a long tail of residual interference greater than zero over multiple UIs of delay. For example, the pulse response may demonstrate residual interference greater than zero over approximately 2.5, 3.0, and 3.5 UIs of delay. On the other hand, if an LE applies too much amplification, the pulse response may include a long tail of residual interference less than zero over multiple UIs of delay. The particular components chosen for an adaptive equalizer control system may depend on one or more characteristics of the transmission channel. For example, communication through particular transmission channels may benefit only slightly, if at all, from the use of a DFE. Particular adaptive equalizer control systems may utilize only an LE (without a DFE) to reduce residual ISI with greater than or equal to approximately 1.0 UIs of delay or with greater than or equal to even less than approximately 1.0 UIs of delay.

Particular embodiments may utilize adaptive equalization as described herein in contexts other than signal transmission. As an example and not by way of limitation, particular embodiments may apply adaptive equalization as described herein to a recording channel, such as a magnetic, optical, or other recording channel.

Figure 2:
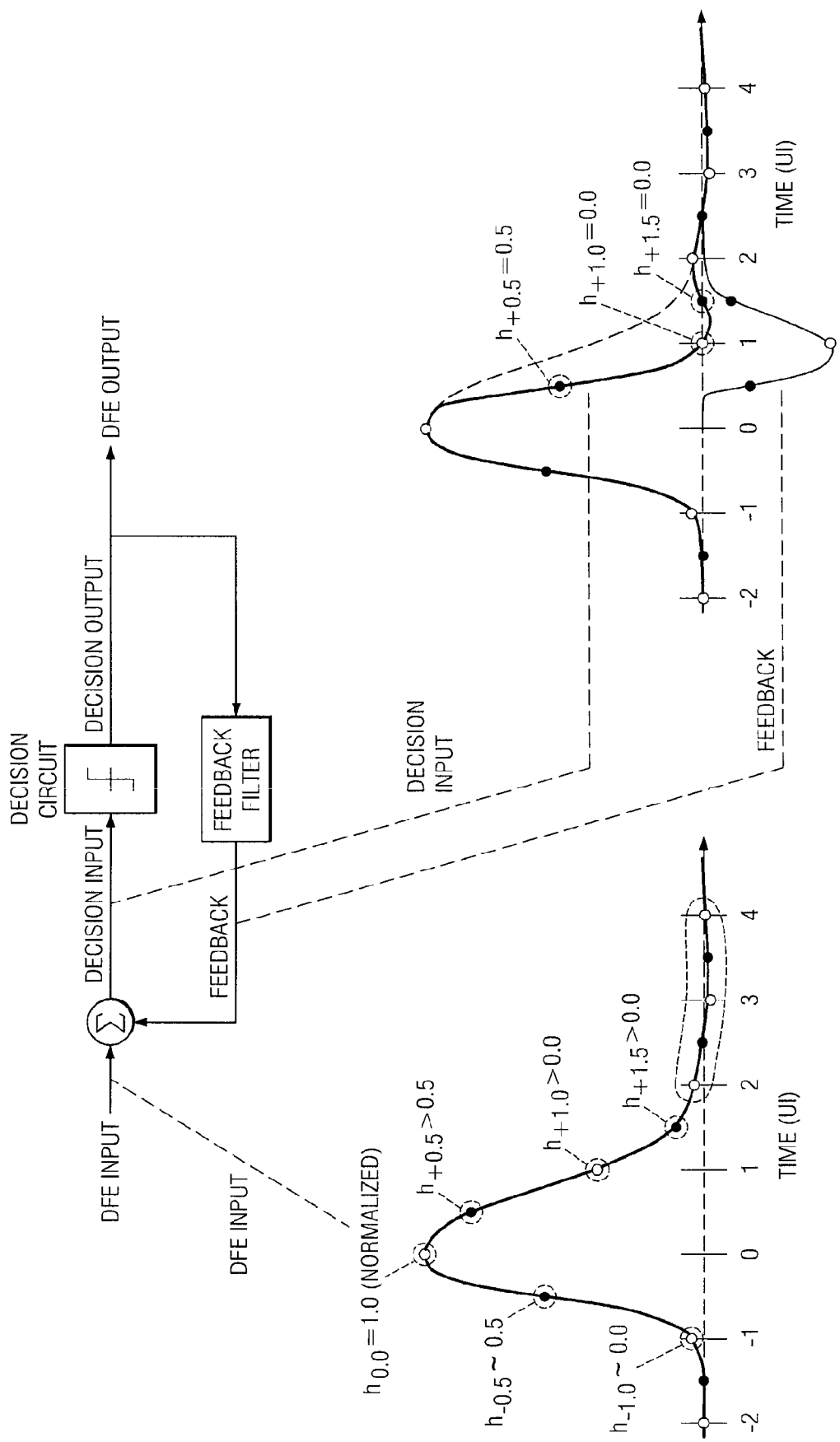
FIG. 2 illustrates an example DFE.

FIG. 2 illustrates an example DFE. The DFE receives DFE input, combines the DFE input with a feedback signal generated by a feedback filter, processes the combined signal using a decision circuit that performs sampling and 1-bit analog-to-digital (A/D) conversion, and outputs DFE output. The feedback signal cancels residual ISI in the DFE input. Herein, "cancel" may mean "reduce," where appropriate. For a 1-tap DFE, the feedback signal may have a negative peak at approximately 1.0 UIs. For a 2-tap DFE, the feedback signal may have a negative peak at approximately 1.0 UIs and 2.0 UIs. In FIG. 2, the feedback signal has a nonzero value at approximately 0.5 UIs and 1.5 UIs and has a zero value at all other discrete timings with an interval of 0.5 UIs. In particular embodiments, the DFE does not utilize feedback from less than or equal to 0.5 UIs of prior data. Instead, the DFE combines the feedback signal with later UIs of prior data.

In particular embodiments, the DFE includes a feedback loop having a 1-tap feedback filter similar to a duo-binary partial-response equalizer without pre-coding and employs a speculative technique to unroll the feedback loop. Although the present disclosure describes and illustrates particular DFEs including particular combinations of particular components for particular adaptive control using particular adaptive control algorithms, the present disclosure contemplates any suitable DFEs including any suitable combinations of any suitable components for any suitable adaptive control using any suitable adaptive control algorithms. As an example and not by way of limitation, particular embodiments may utilize adaptive control that is based on one or more conventional adaptive control algorithms, such as, for example, a Least-Mean-Square (LMS) algorithm, a Sign-Sign-Least-Mean-Square (SS-LMS) algorithm, or a Zero-Forcing (ZF) algorithm. As another example, particular embodiments may utilize a sign-based ZF algorithm that does not require measuring quantities of residual ISI. In particular embodiments, LEs (in addition to DFEs) utilize one or more adaptive control algorithms.

Figure 3:
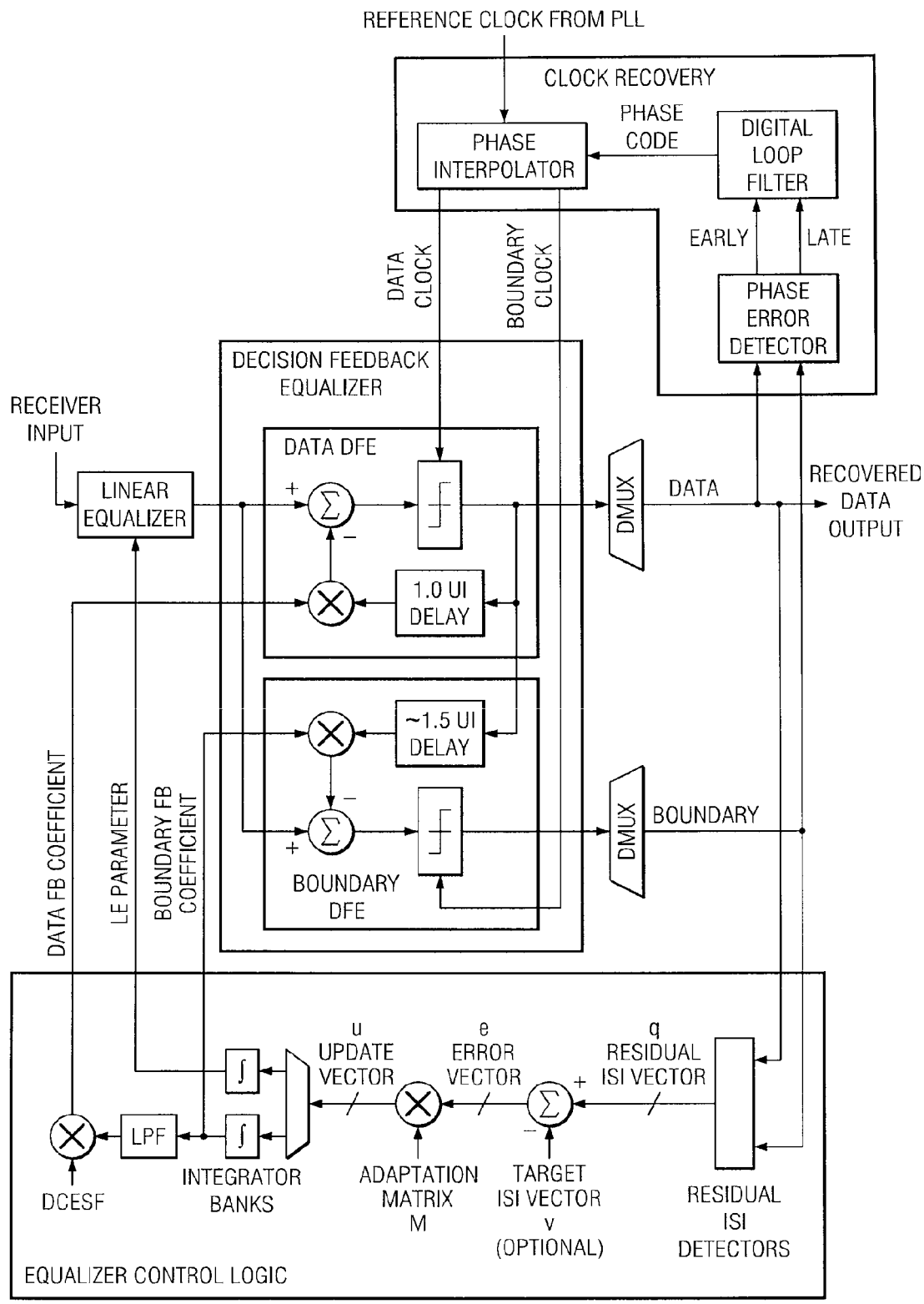
FIG. 3 illustrates an example system for adaptive control of an example LE and an example DFE.

In FIG. 3, the DFE is divided into a data DFE and a boundary DFE. The data and boundary DFEs may each be implemented using a speculative or loop unrolled scheme. In particular embodiments, in the data DFE, the output of the decision circuit is delayed by approximately 1.0 UIs, multiplied by a data feedback (FB) coefficient, and then subtracted from the input from the LE before the decision circuit in the data DFE makes a decision with respect to a next symbol. In particular embodiments, the output of the decision circuit has a binary value, either +1 or −1. If the data FB coefficient matches the residual ISI at approximately 1.0 UIs delay, the data DFE will cancel the residual ISI at approximately 1.0 UIs delay. In particular embodiments, in the boundary DFE, the feedback signal is based on the output of the decision circuit in the data DFE. The output of the decision circuit in the data DFE is delayed by approximately 1.5 UIs, multiplied by the boundary feedback (FB) coefficient, and then subtracted from the input from the LE before the decision circuit in the boundary DFE makes a decision with respect to a next boundary. The amount of delay may vary from approximately 1.5 UIs when the delay from the boundary clock to the data clock varies from approximately 0.5 UI. For example, if the delay from the boundary clock to the data clock were approximately 0.3 UIs, the feedback delay would be approximately 1.7 UIs.

In FIG. 3, the outputs of the data DFE and the boundary DFE are demultiplexed and then used by clock-recovery and equalizer-control logic. The demultiplexed data is used as the recovered data output. The clock-recovery logic uses a reference clock from a phase-locked loop (PLL). The clock-recovery logic detects phase error from the demultiplexed data and boundary values, processes the phase error using a digital filter to adjust a phase code for a data clock and a boundary clock, and generates the data clock and the boundary clock based on the reference clock and the phase code. In particular embodiments, the clock-recovery logic adjusts the phase code based on 0.5 UIs of delay from the boundary clock to the data clock. In particular embodiments, the clock-recovery logic adjusts the phase code based on 0.3 UIs of delay from the boundary clock to the data clock.

The equalizer-control logic in FIG. 3 receives recovered data output and recovered boundary output and generates and transmits equalizer parameters for controlling the amount of compensation for an equalizer to apply. In particular embodiments, equalizer-control logic uses one or more residual ISI detectors to detect a residual ISI vector from the demultiplexed data and boundary values and uses integrators to generate equalizer parameters. As used herein, the phrase "residual ISI" may refer to one or more "residual ISI vectors" or one or more vector values of residual ISI vectors, except where a particular "residual ISI component" is specified. A residual ISI vector may be produced using any mathematical operations that produce vector output from any type of data, such as, for example, scalar data and vector data, and may have any length. Mathematical operations used to produce vector values may be performed any number of times to produce any number of vector values for any number of vectors. In particular embodiments, equalizer-control logic may require additional hardware such as a monitoring circuit to adaptively control equalizer parameters. Alternatively, equalizer-control logic adaptively controls equalizer parameters using a scheme that does not require additional hardware such as a monitoring circuit, which may, for example, increase loading to a high-speed analog circuit and power consumption. Equalizer-control logic may adaptively control any suitable control parameter such as, for example, LE gain, boundary FB coefficient, data FB coefficient, and offset code, or any combination of suitable control parameters. For example, equalizer-control logic may provide FB control for a boundary DFE based on a boundary FB coefficient and feed-forward control for a data DFE based on the boundary FB coefficient.

Particular embodiments generate a data FB coefficient from a boundary FB coefficient. To generate the data FB coefficient, the boundary FB coefficient may be processed by a low-pass filter (LPF) to compute an average and the average may be multiplied by a data coefficient scaling factor (DCESF). The boundary FB coefficient may be controlled using a feedback control scheme, since a change in the boundary FB coefficient may affect a corresponding change in boundary value, with observable effects. The data FB coefficient may be controlled based on the boundary FB coefficient using a feed-forward control scheme or an open-loop control scheme, since a change in the data FB coefficient may not affect a corresponding change in data value. The use of a feed-forward control scheme for the data FB coefficient may reduce data errors.

In particular embodiments, equalizer-control logic includes an adaptation matrix. For example, the equalizer-control logic may force residual ISI toward zero by detecting residual ISI and integrating each residual ISI component with a different weight according to the adaptation matrix, where weight depends on at least the equalizer type and the residual ISI. In particular embodiments, the equalizer-control logic includes a vector of binary values representing the sign of residual ISI components. In particular embodiments for processing recovered data output, equalizer-control logic includes a target ISI vector and subtracts the target ISI vector from the residual ISI vector. The target ISI vector may be, for example, the residual ISI vector observed in the best known state (with respect to bit-error rate (BER)) for the worst-case transmission channel. In particular embodiments, equalizer-control logic may be compatible with any correlated data sequences, including monotone sequences (such as a repeated 0–1-0-1 pattern).

The equalizer-control logic in FIG. 3 may be implemented using known techniques such as General Zero-Forcing or Gauss-Newton algorithms. With General Zero-Forcing algorithms, there is no optional target ISI vector (i.e. v=0), and the adaptation matrix is calculated as a Jacobian (derivative) matrix of the impulse response (or the residual ISI vector) of the worst-case channel and the equalizer combined together with respect to the vector of equalizer control variables. For the worst-case channel, it will minimize the sum of squares of the residual ISI in the equilibrium state. For other channels, the sum of squares of the residual ISI is not necessarily minimized in the equilibrium state, but the operating margin is usually bigger than the worst-case channel for a wide range of channel characteristics. A problem of General Zero-Forcing is that it assumes linearity of the system, and the bit error rate (BER) is not necessarily minimized for the worst-case channel even if the sum of square of the residual ISI is minimized.

One or more of these problems may be solved by particular embodiments using an optional target ISI vector and a Gauss-Newton algorithm, where the target ISI vector is the residual ISI vector observed in the best known state (with respect to BER) for the worst-case channel. As in General Zero-Forcing, the adaptation matrix is a Jacobian (derivative) matrix indexing an impulse response (or the residual ISI vector) for the worst-case channel, an equalizer-type, and a vector of equalizer-control variables. Contrary to the Jacobian (derivative) matrix used in General Zero-Forcing, the adaptation matrix indexes the impulse response observed in the best known state (with respect to BER) for the worst-case channel, whereas the Jacobian (derivative) matrix in the General Zero-Forcing algorithm is thought to be state independent because General Zero-Forcing assumes linearity of the system. By using the target ISI vector and a Gauss-Newton algorithm, we may minimize BER in the equilibrium state for the worst-case channel.

In particular embodiments, equalizer-control logic uses a sign-based method to implement a modified General Zero-Forcing or Gauss-Newton algorithm that realizes the same or similar results. In particular embodiments, the sign-based method is configured to achieve statistically equivalent results to the results of the General Zero-Forcing or Gauss-Newton algorithm in a long term. To implement the sign-based method, equalizer-control logic measures only sign information, and may calculate the quantity for each component of the residual ISI vector using only the sign information. Then, equalizer-control logic performs arithmetic and scalar operations using the residual ISI vector to generate equalizer parameters, as FIG. 3 illustrates. The description below with respect to FIG. 16 further describes equalizer-control logic using a sign-based General Zero-Forcing method for adaptive equalizer control.

Figure 4:
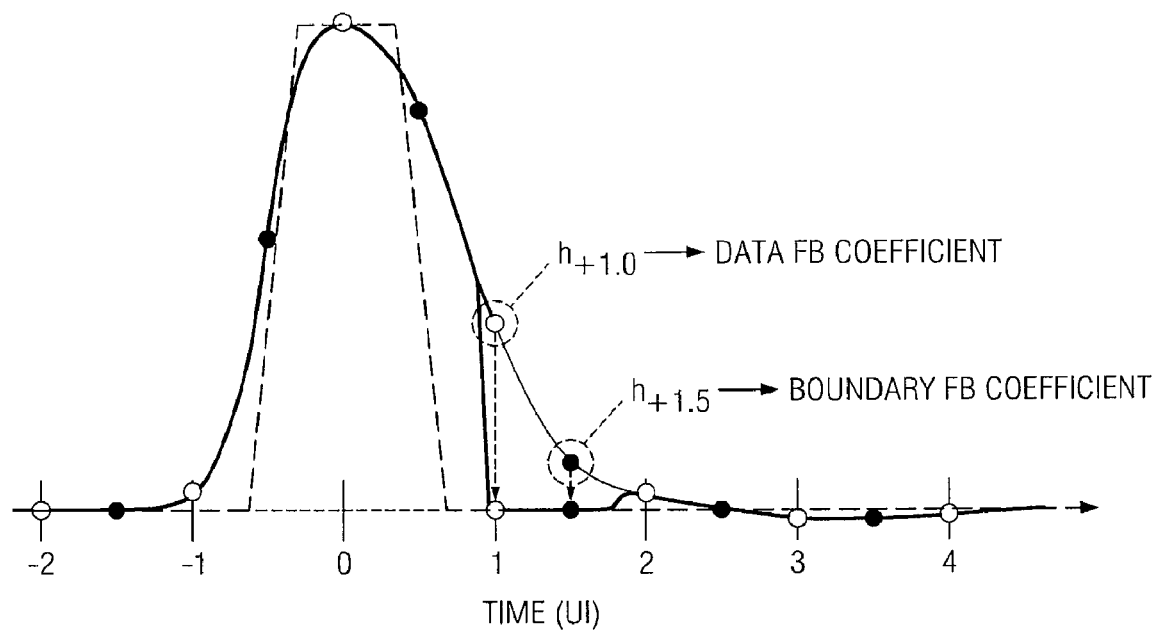
FIG. 4 illustrates an example pulse response at an output of an example LE and example data and boundary feedback (FB) coefficients.

FIG. 4 illustrates an example pulse response at an output of an example LE and example data and boundary FB coefficients. The pulse response of the LE output at 1.0 UI of delay ($h_{+1.0}$) corresponds to the data FB coefficient for 1.0 bit of prior data. The pulse response of the LE output at 1.5 UIs of delay ($h_{+1.5}$) corresponds to the boundary FB coefficient for 1.5 bits of prior data. When the pulse response on and after 2.0 UIs of delay is minimized as shown in FIG. 4, the data feedback signal for 1.0 bit of prior data ($h_{+1.0}$) is spread into both $h_{+0.5}$ and $h_{+1.5}$. In particular embodiments, the pulse response at 1.5 UIs of delay ($h_{+1.5}$) is measured by adjusting the boundary FB coefficient for 1.5 bits of prior data and observing the change in the pulse response at 1.5 UIs of delay ($h_{+1.5}$). In particular embodiments, the pulse response at 0.5 UIs of delay ($h_{+0.5}$) is not measured and is ignored because the effect of $h_{+0.5}$ on boundary value is cancelled or at least minimized by clock-recovery in a long term. Then, the pulse response at 1.0 UI of delay ($h_{+1.0}$) may be inferred as a scaled value of the pulse response at 1.5 UIs of delay ($h_{+1.5}$). The inferred pulse response at 1.0 UI of delay ($h_{+1.0}$) may be set as the data FB coefficient for 1.0 bit of prior data.

In particular embodiments, this scheme may be implemented using a 2-tap DFE. For example, for a 2-tap data DFE, a 2-tap boundary DFE may generate a feedback signal at 1.5 UIs and 2.5 UIs of delay based on 1.5 and 2.5 bits of prior data respectively. In particular embodiments, the pulse response at 1.5 UIs of delay ($h_{+1.5}$) may be measured by adjusting the first boundary FB coefficient for 1.5 bits of prior data and observing the change in the pulse response at 1.5 UIs of delay ($h_{+1.5}$). The pulse response at 2.5 UIs of delay ($h_{+2.5}$) may be measured by adjusting the second boundary FB coefficient for 2.5 bits of prior data and observing the change in the pulse response at 2.5 UIs of delay ($h_{+2.5}$). Then, the pulse response at 2.0 UIs of delay ($h_{+2.0}$) may be inferred as the average of the pulse response at 1.5 UIs of delay ($h_{+1.5}$) and the pulse response at 2.5 UIs of delay ($h_{+2.5}$), i.e., $$h_{+n} = \frac{h_{+n-0.5} + h_{+n+0.5}}{2}.$$

The inferred pulse response at 2.0 UIs of delay ($h_{+2.0}$) may be set as the data FB coefficient for 2.0 bits of prior data.

In particular embodiments, this scheme may be implemented using a multi-tap DFE. For example, for an $n^{th}$-tap data DFE (n>1), an $n^{th}$-tap boundary DFE may generate a feedback signal at (n+0.5) UIs and (n−0.5) UIs of delay based on (n+0.5) and (n−0.5) bits of prior data respectively. In particular embodiments, the residual ISI at (n+0.5) UIs of delay ($h_{+n+0.5}$) may be measured by adjusting the $n^{th}$ boundary FB coefficient for (n+0.5) bits of prior data and observing the change in the residual ISI at (n+0.5) UIs of delay ($h_{+n+0.5}$). The residual ISI at (n−0.5) UIs of delay ($h_{+n-0.5}$) may be measured by adjusting the $(n-1)^{th}$ boundary FB coefficient for (n−0.5) bits of prior data and observing the change in the residual ISI at (n−0.5) UIs of delay ($h_{+n-0.5}$). Then, the residual ISI at n UIs of delay ($h_{+n}$) may be inferred as the average of the residual ISI at (n+0.5) UIs of delay ($h_{+n+0.5}$) and the residual ISI at (n−0.5) UIs of delay ($h_{+n-0.5}$). The inferred residual ISI at n UIs of delay ($h_{+n}$) may be set as the $n^{th}$-tap FB coefficient of the data DFE for n bits of prior data.

Figure 5:
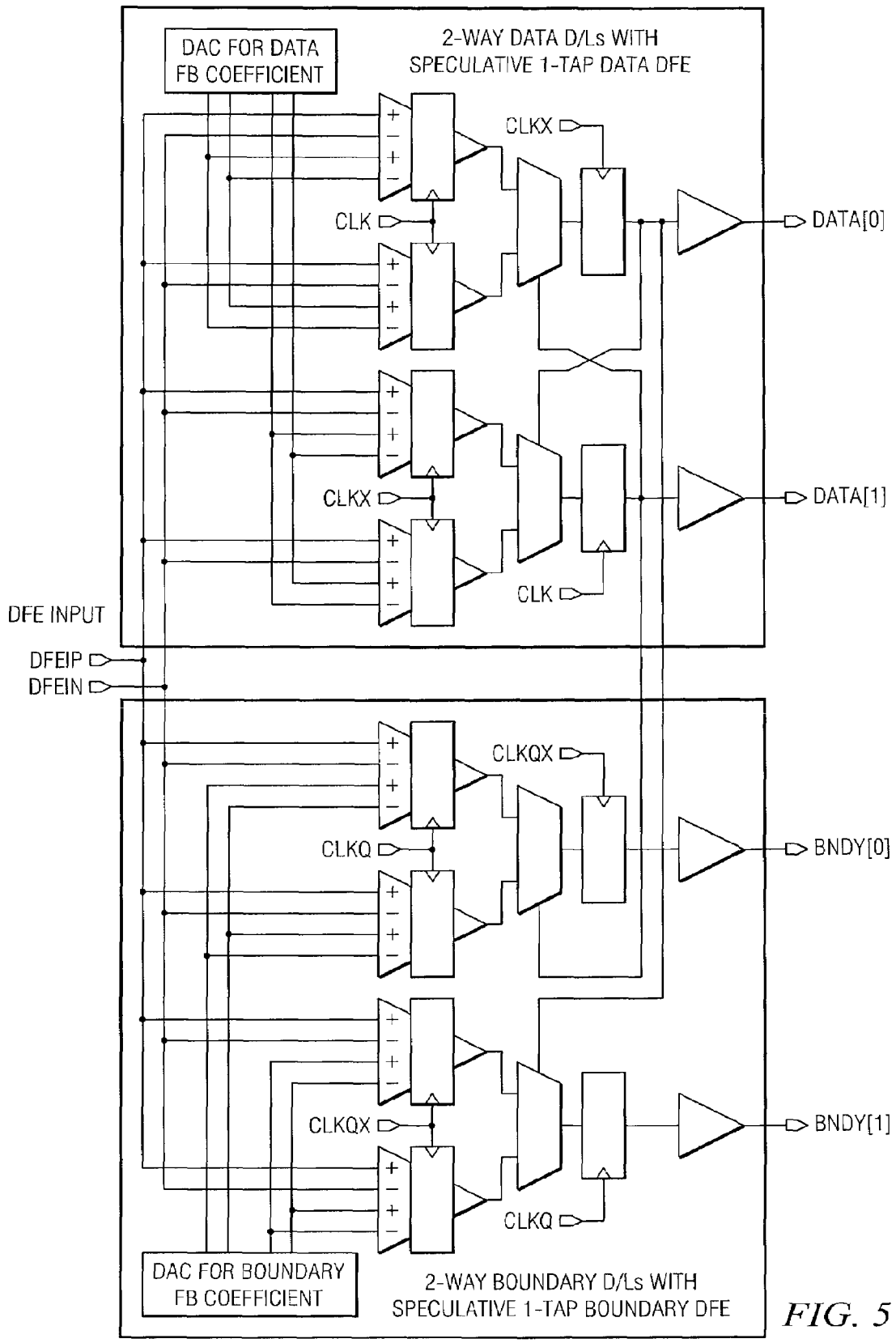
FIG. 5 illustrates an example speculative 1-tap DFE.

FIG. 5 illustrates an example speculative 1-tap DFE. The example speculative 1-tap DFE uses a speculative technique (also known as a loop-unrolling technique) to reduce residual ISI in the pulse response at the DFE input. In particular embodiments, instead of generating a real analog feedback signal to apply to the DFE input before the decision circuit as shown in FIGS. 2 and 3, two decision circuits may be used in parallel at the same timing. One decision circuit adds a FB coefficient to the input, and another decision circuit subtracts the FB coefficient from the input. After speculative decisions are made, one of the results may be chosen based on previously received data (1 bit of prior data for data DFE or 1.5 bits of prior data for boundary DFE). In particular embodiments, the DFE input is a differential signal and the FB coefficient is a reference voltage. The polarity of the FB coefficient is flipped by swapping the positive and negative signals of the reference voltage for the FB coefficient.

The example speculative 1-tap DFE illustrated in FIG. 5 provides an example of an equalizer that applies compensation for distortion in parallel. Compensation for distortion may be applied in parallel in any suitable manner (e.g., before or after distortion occurs) using any suitable equalization technique (e.g., transmitter pre-emphasis equalization or receiver equalization) and any suitable equalizer (e.g., an analog continuous-time first-order derivative filter, an analog continuous-time second-order derivative filter, a multi-tap finite-impulse-response filter, a 1-tap DFE, a 2-tap DFE or a multi-tap DFE). In particular embodiments, compensation for distortion may be applied in series in any suitable manner using any suitable equalization technique and any suitable equalizer.

Figure 6:
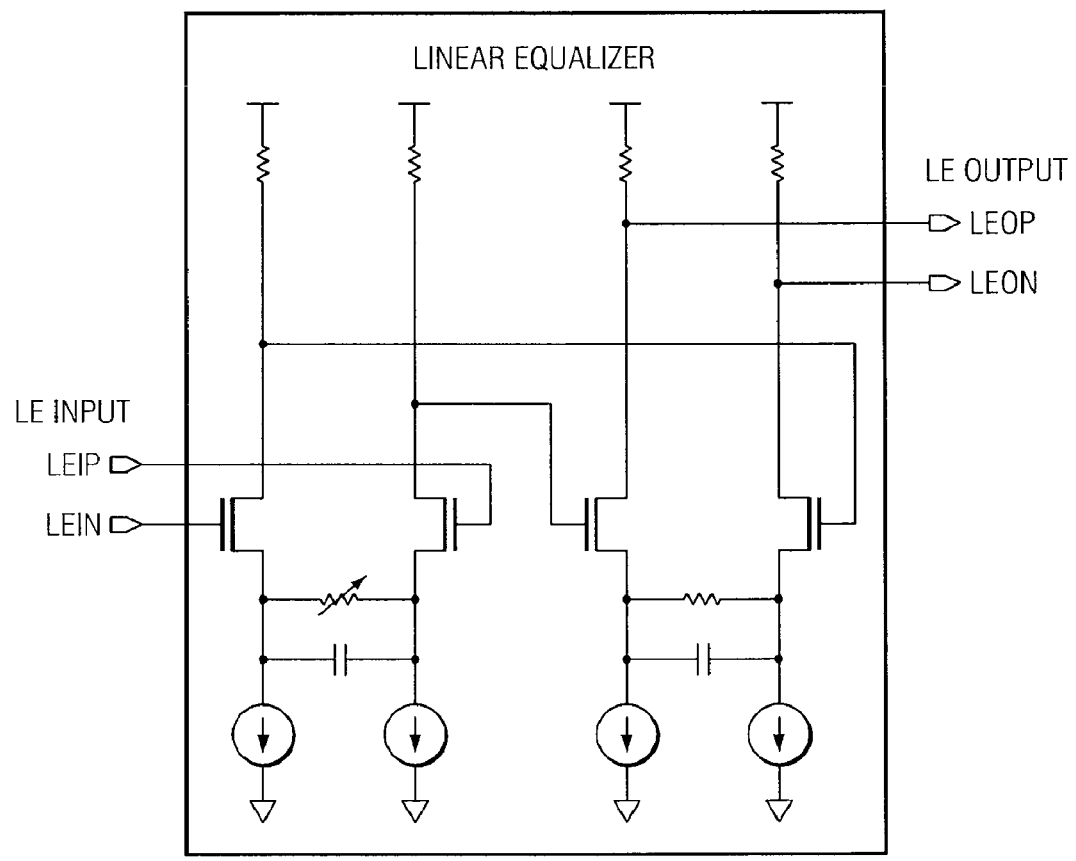
FIG. 6 illustrates an example LE.
Figure 7:
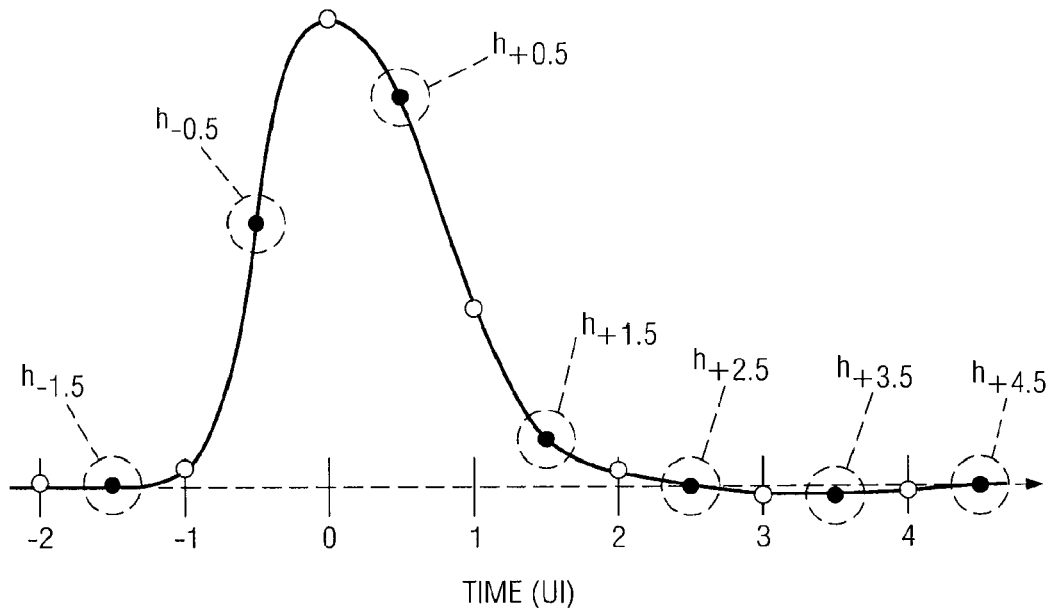
FIG. 7 illustrates example residual boundary intersymbol interference (ISI) in an example pulse response at an output of an example LE.
Figure 8:
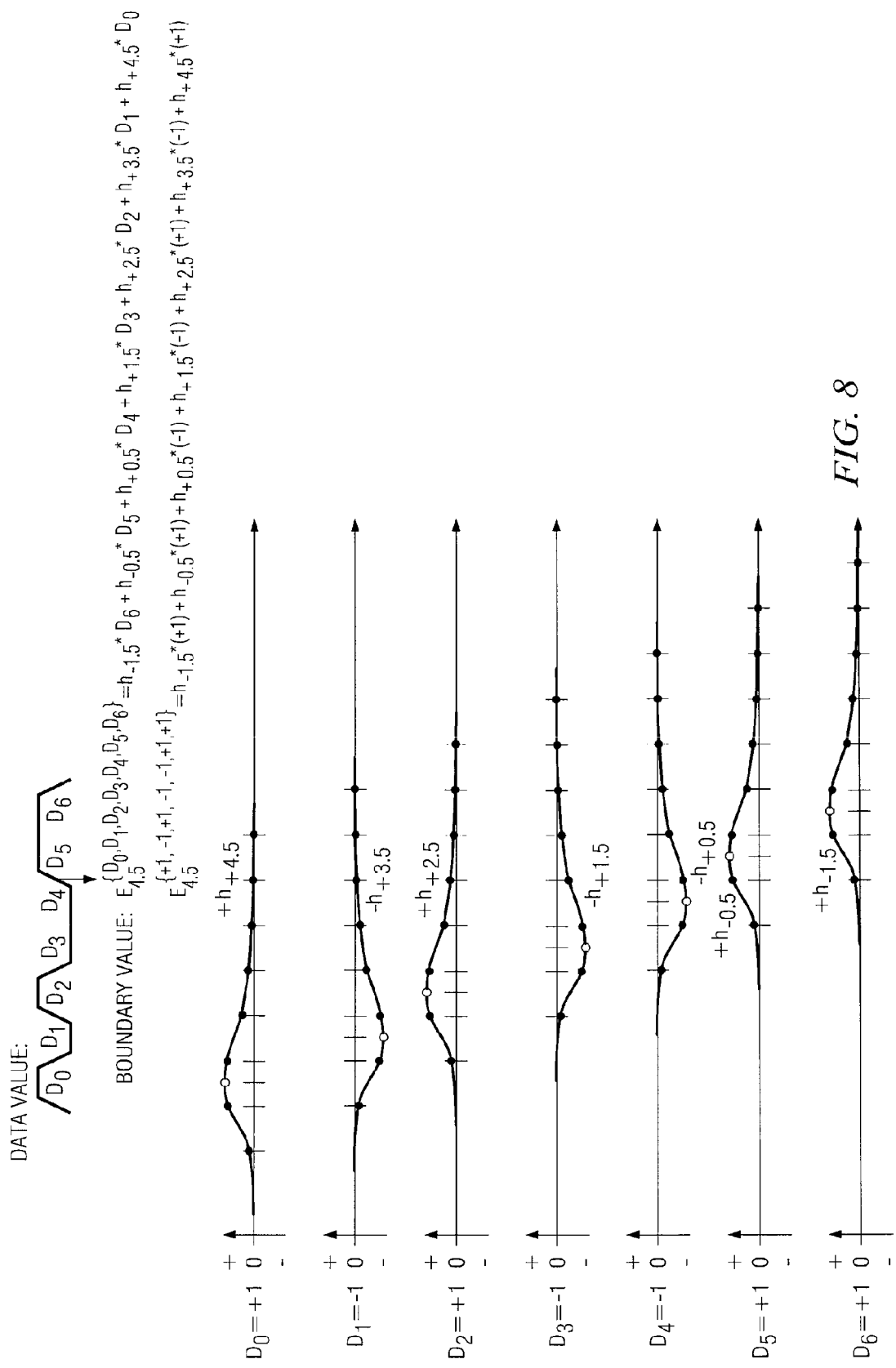
FIG. 8 illustrates example convolution of example residual boundary ISI and an example data sequence.

FIG. 6 illustrates an example LE. The LE includes two-stage differential buffers with capacitive and resistive degeneration. In particular embodiments, an LE parameter is adjusted by adjusting one of the degeneration resistors. In particular embodiments, residual ISI occurring after a particular UI of delay may be minimized by adjusting the LE parameter and observing the change in the residual ISI. Any suitable LE (such as, for example, a first or second order derivative filter) may be used to reduce residual ISI occurring after a particular UI of delay. FIG. 7 illustrates example residual boundary ISI in an example pulse response at an output of an example LE. While receiving a continuous data sequence, the boundary value seen by the boundary DFE may be represented as the convolution of the residual boundary ISI and the data sequence, as FIG. 8 shows. FIG. 8 illustrates example convolution of an example residual boundary ISI and an example data sequence. As an example and not by way of limitation, if the receiving data sequence is $\{D_0, D_1, D_2, D_3, D_4, D_5, D_6\}$, the boundary value $E_{4.5}$ between $D_4$ and $D_5$ may be represented as $E_{4.5}^{\{D_0,D_1,D_2,D_3,D_4,D_5,D_6\}} \approx h_{-1.5}D_6 + h_{-0.5}D_5 + h_{+0.5}D_4 + h_{+1.5}D_3 + h_{+2.5}D_2 + h_{+3.5}D_1 + h_{+4.5}D_0$, with additional terms for more distant data being omitted because their effect is small.

In FIG. 8, the data points of the data sequence D include $D_0$, $D_1$, $D_2$, $D_3$, $D_4$, $D_5$, and $D_6$. The boundary points are illustrated as darkened circles on either side of the unfilled circles. Clock-recovery or equalizer-control logic may sample the recovered data output at a data point to generate a data value (e.g. $D_0$-$D_6$) and at a boundary point to generate a boundary value (e.g. $E_{0.5}$-$E_{5.5}$). Each sampled data value and boundary value may be a low value, a high value, or a random value that randomly takes a high value or a low value. In particular embodiments, a low value is a "0," a high value is a "1," a random value is either a "0" or a "1," and an average of random values is "0.5." In particular embodiments, a low value is a "−1," a high value is a "1," a random value is either a "−1" or a "1," and an average of random values is "0." A change from a high to a low value or from a low to a high value between two successive data values is a transition. In FIG. 8, transitions occur between low data value D4 and high data value D5, between high data value D0 and low data value D1, between low data value D1 and high data value D2, and between high data value D2 and low data value D3. In a signal exhibiting no residual ISI effects, each boundary value between two successive data values with opposite values is typically a random value. For such a signal, the equalizer-control logic may adjust the gain applied to the DFE input up or down randomly, as ISI effects are already being fully compensated or do not exist. If the number of up adjustments substantially equals the number of down adjustments, the gain applied to the input signal may remain, on average, at the same level. If the number of up adjustments does not substantially equal the number of down adjustments, the gain applied to the input signal may drift slightly from its initial level. Such drift of the gain level may produce slight residual ISI. The equalizer-control logic may detect this ISI and adjust the gain back to the average initial level.

In particular embodiments, an equalizer may control more than one independent parameter, such as, for example, the unmodified, first-order-derivative, and second-order-derivative components of a signal. Generally, "first-order-derivative" components are the result of a "first-order-derivative" operation, which uses any suitable electronic component or collection of components or circuitry, such as, for example, a high-pass filter, to produce an output that is linearly proportional to the first-order derivative of an incoming signal with respect to time. According to particular embodiments, a derivative operation takes the derivative of an incoming signal with respect to time, such as, for example, the voltage change of the incoming signal per 100 pico-seconds. Derivative operations may be applied to a signal once or multiple times, resulting in an output signal that is proportional to the first, second, third, or higher order derivative of the incoming signal with respect to time based on the number of times the derivative operation is applied. Examples of multiparameter (or multidimensional) equalizers include 2-tap DFEs, which may independently control a first control parameter and a second control parameter, and 3-tap finite impulse response (FIR) filters, which may independently control a second control parameter and a third control parameter. The present disclosure contemplates any suitable multidimensional equalizer. In particular embodiments, compensation is adjusted independently for each independent equalizer parameter. Adaptive equalizer control may be applied to a first control parameter independently by adjusting the first control parameter while the other control parameters remain fixed. In a 2-tap DFE, for example, the first- and second-tap coefficients may be adjusted independently, and each of these adjustments may comprise an adjustment to the compensation for distortion. Alternatively, multidimensional equalizers may adjust compensation according to more than one control parameter at the same time (in the aggregate) by adjusting compensation according to a particular function that incorporates more than one independent parameter.

Compensation for distortion (such as, for example, gain) may be adjusted independently for each independent control parameter based on particular relationships between a sampled boundary value that is between successive data values that resulting in a transition and one or more sampled data values before or after the boundary value in particular timings. Particular relationships may correspond to particular types of ISI for particular independent equalizer parameters. When, for example, an adaptive equalizer-control system detects such relationships among a sampled boundary value and sampled data values (e.g. using predefined data-value patterns) adaptive equalizer control may be adjusted by adjusting the one or more particular independent equalizer parameters.

In particular embodiments, the predefined data value patterns used by the adaptive equalizer-control system to compare with the incoming stream of sampled data values may be sensitive to ISI for particular independent control parameters. These patterns may be selected, for example, based on the sensitivity of the boundary value between data values resulting in a transition to the independent control parameter being adjusted. In particular embodiments, these patterns may be selected based on the partial derivative of the pulse response at that independent control parameter (e.g., on the sign or magnitude of the partial derivative) because the boundary value seen by the decision circuit in the boundary DFE may be represented as a convolution of the residual boundary ISI and the data sequence, as FIG. 8 shows.

Figure 9:
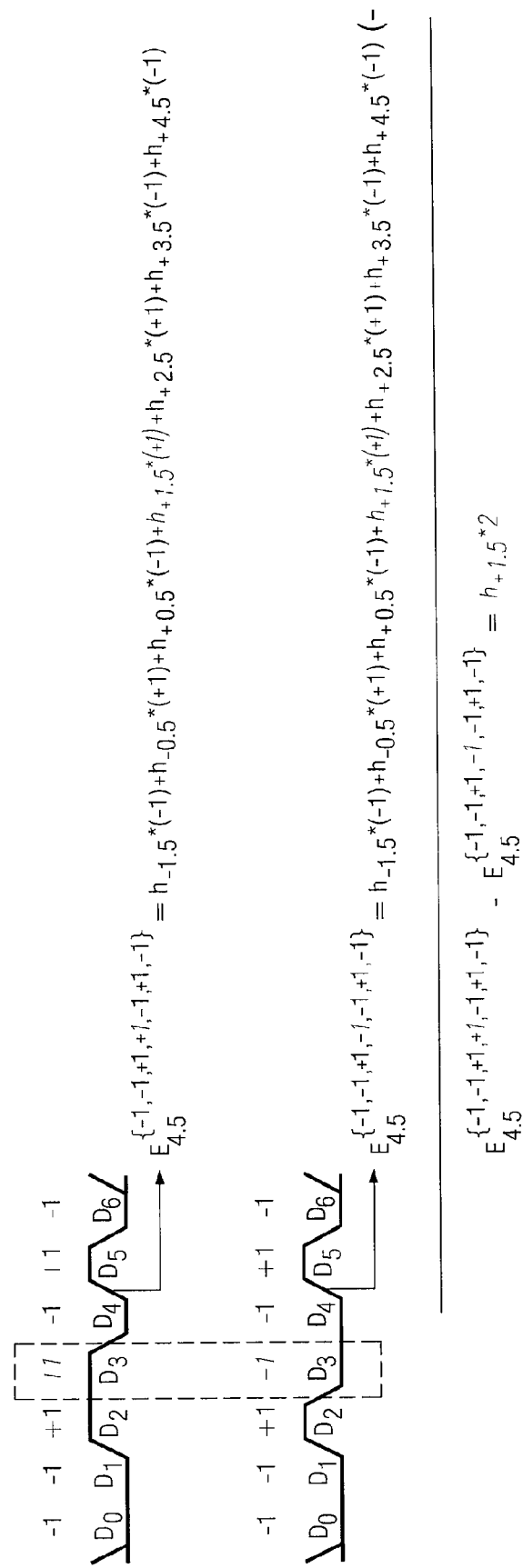
FIG. 9 illustrates example detection of residual boundary ISI based on one or more boundary-value differences between two data sequences.

FIG. 9 illustrates example detection of residual boundary ISI based on one or more data-value differences between two data sequences. In particular embodiments, residual boundary ISI may be measured by taking a difference in boundary values between two data sequences which have different data values in the data bits corresponding to the residual boundary ISI to be measured. In the illustrated example, $h_{+1.5}$ is measured by taking a difference in boundary values $E_{4.5}$ between $D_4$ and $D_5$ for two data sequences which have different data values at $D_3$. Data values $D_0, D_1, D_2, D_4, D_5$ and $D_6$ are the same for both data sequences. Each data value and boundary value may comprise a low value, a high value, or a random value that takes either a high value or a low value randomly. In particular embodiments, each data value and boundary value may comprise a quantity, which may be measured, for example, at full-range precision analog level. In particular embodiments, only the sign (not the quantity) of the boundary values is used to measure the boundary-value differences.

In particular embodiments, residual boundary ISI may be measured for its sign and for its magnitude to some degree by taking statistical differences of the binary boundary values for the two data sequences as long as the binary boundary values are not statistically saturated. For example, the probabilities of +1 (or −1) boundary values are the same for the two data sequences in FIG. 9, if and only if the residual boundary ISI $h_{+1.5}$ is absolutely zero. Otherwise, the probability of +1 boundary values is higher (or lower) for the data sequence with $D_3$ equal to +1 than the data sequence with $D_3$ equal to −1, depending on whether the residual boundary ISI at 1.5 UIs of delay ($h_{+1.5}$) is positive or negative. The amount of statistical difference indicates the magnitude of the residual boundary ISI at 1.5 UIs of delay ($h_{+1.5}$).

If the binary boundary values are statistically saturated, the difference in binary boundary values between the two data sequences is zero and thus cannot be used to measure residual boundary ISI. To prevent statistical saturation of the binary boundary values between the two data sequences, the number of high values present in the other data values (e.g. $D_0, D_1, D_2, D_4, D_5$ and $D_6$ in FIG. 9) used to calculate the difference in boundary values between the two data sequences is close to (and thus balanced with) the number of low values present in the other data values (e.g. $D_0, D_1, D_2, D_4, D_5$ and $D_6$ in FIG. 9) used to calculate the difference in boundary values between the two data sequences. By watching for various filter patterns in a balanced manner, adaptive equalizer control may become more independent of incoming data sequences. For example, there may be some data dependency for some periodic or quasi-periodic data sequences where a periodic or quasi-periodic data sequence does not include one or some of the filter patterns at all. In such a case, one scheme may be to wait for the filter pattern expecting that the current incoming data sequence changes at some point in the future. Another scheme may be to skip filter patterns that may not appear in the current incoming data sequence.

In particular embodiments, $D_4$ and $D_5$ must have different data values to make a transition at $E_{4.5}$ where a boundary value $E_{4.5}$ is measured. If $D_4$ and $D_5$ have the same value, the binary boundary value $E_{4.5}$ is completely statistically saturated, because $E_{4.5}$ always takes the same value as $D_4$ and $D_5$. The boundary value $E_{4.5}$ is not statistically saturated, only if $D_4$ and $D_5$ have different values and there is a data transition at $E_{4.5}$.

In particular embodiments, balanced application of adaptive control actions enables adaptive control algorithms to provide consistent adaptation results among various data sequences. Balanced application of adaptive control actions may be achieved by selecting data sequences for the adaptive control actions. In particular embodiments, if data sequences observed during adaptation are limited, the data sequences for residual ISI detection must be chosen from those data sequences observed during adaptation. For example, adaptive control applied for 10 GBASE-CX4 starts with the 8B10B idle data sequence which consists of only 8B10B /A/, /K/, /S/ symbols because the initial incoming data sequence at start up may be an idle data sequence. It may be desirable to avoid data sequences which do not appear in the 8B10B idle data sequence, at least during link initialization. Otherwise, the link will not start up. Once initialization is complete, equalizer-control logic may use data sequences that appear in real data traffic, not idle data sequences.

Figure 10:
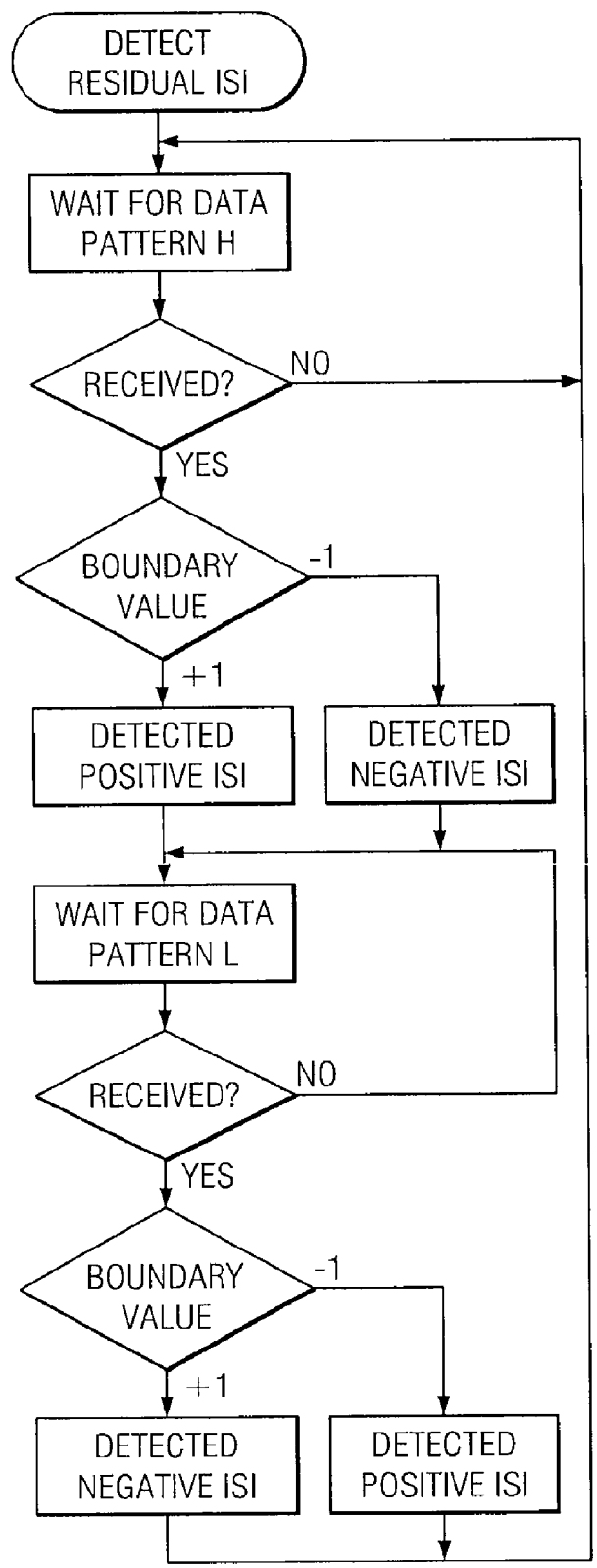
FIG. 10 illustrates example statistical detection of residual boundary ISI using two data sequences.

FIG. 10 illustrates example statistical detection of residual boundary ISI using two data sequences. In particular embodiments, data pattern H and L have different values in the data bits corresponding to the residual boundary ISI to be measured. FIG. 10 illustrates an example method for statistically detecting residual ISI using two data sequences. This method includes calculating a difference between the two data sequences. In particular embodiments, it is advantageous to use only one data sequence to detect boundary residual ISI in an aggregate manner. To use one data sequence, the example method shown in FIG. 10 may be modified to include the portion related to data pattern H and not include the portion related to data pattern L.

Figure 11:
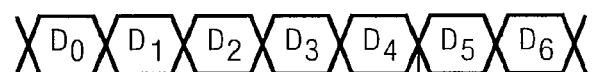
FIG. 11 illustrates two example data sequences for detecting example residual boundary ISI.

FIG. 11 illustrates two example data sequences for detecting example residual boundary ISI at 1.5 UIs of delay ($h_{+1.5}$). Herein, the terms "pattern" and "sequence" may be used interchangeably, where appropriate. Since data patterns H and L are watched for alternatively, two data patterns are taken into account the same number of times over a long term. In particular embodiments, the two data patterns behave in opposite regarding the polarity of boundary values. In particular embodiments, the statistical difference of the boundary values between two data patterns which are taken into account the same number of times may correspond to the actual difference over a long term for any incoming data sequence, even if data pattern H is received much more frequently than data pattern L.

Figure 12:
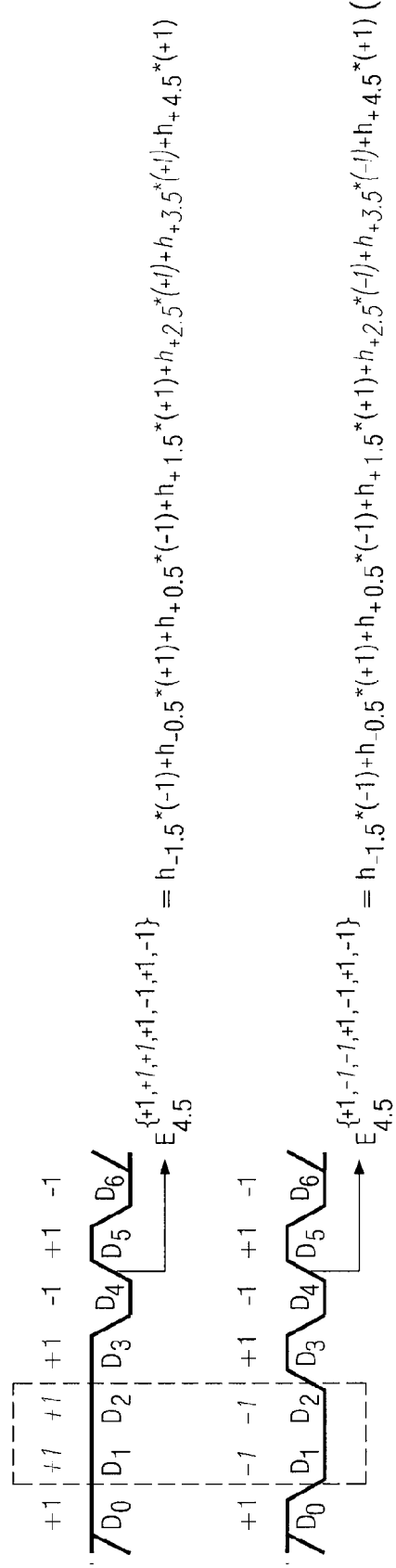
FIG. 12 illustrates example aggregate detection of residual boundary ISI using two data sequences.

In particular embodiments, the above scheme may be extended to detect two or more components of residual ISI in an aggregate manner. In particular embodiments, this aggregate detection scheme uses two data patterns which have different data values in the data bits corresponding to the residual ISI components to be measured in an aggregate manner. For example, $h_{+2.5}$ and $h_{+3.5}$ may be detected together as shown in FIG. 12. Aggregate residual boundary ISI ($h_{+2.5}*2 + h_{+3.5}*2$) is measured by taking a difference in boundary values $E_{4.5}$ between two data sequences which have different data values in the data bits corresponding to data bits $D_1$ and $D_2$. Data values $D_0$, $D_3$, $D_4$, $D_5$ and $D_6$ are the same for both data sequences. Aggregate detection of two or more components of residual ISI may be especially useful where various types of data sequences are not observed during adaptation. Aggregate detection of two or more components of residual ISI may also be especially useful for detecting components of residual ISI with more than a certain amount of delay because there is no discrete control over component residual ISI by an LE and because a sum of component residual ISIs may be sufficient for adaptive control of an LE.

Figure 13:
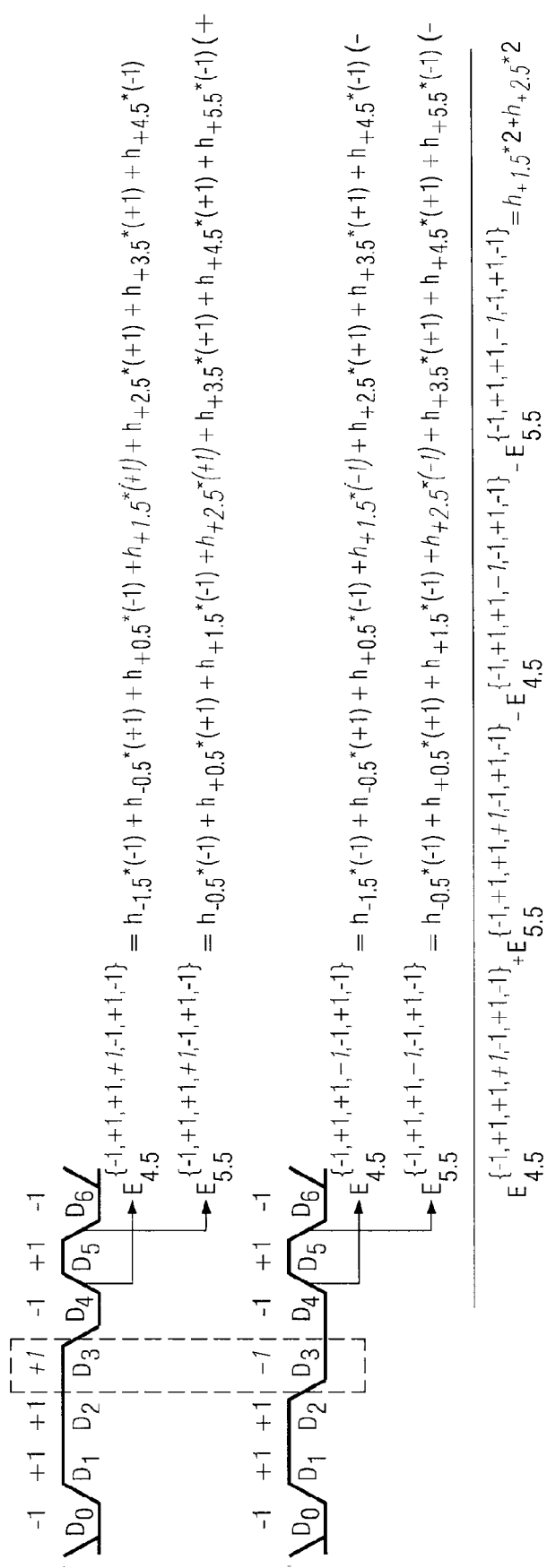
FIG. 13 illustrates example aggregate detection of residual boundary ISI using two successive transitions.

FIG. 13 illustrates example detection of two or more components of residual ISI in an aggregate manner. This aggregate detection scheme uses two data patterns and is based on the boundary values between two successive transitions, where the transitions occur at the same time for both data patterns. In particular embodiments, two data sequences have different values only at one data bit $D_3$, and two successive boundary values at $E_{4.5}$ and $E_{5.5}$ are detected at the same time. The aggregate residual boundary ISI $h_{+1.5}$ and $h_{+2.5}$ are detected when both $E_{4.5}$ and $E_{5.5}$ are positive or negative. When $E_{4.5}$ and $E_{5.5}$ have different values, it may indicate phase error. In particular embodiments, when $E_{4.5}$ and $E_{5.5}$ have different values, detection is skipped altogether instead of separately detecting $h_{+1.5}$ from $E_{4.5}$ and $h_{+2.5}$ from $E_{5.5}$. By skipping detection in this scenario, the detection of residual boundary ISI may become more robust for jitter.

FIG. 14 illustrates example aggregate detection of multiple components of residual boundary ISI using one data sequence. As illustrated, the boundary value is observed for only one data sequence $\{-1,+1,-1,+1,+1,-1,-1\}$. In particular embodiments, the residual boundary ISI at 0.5 UIs of delay ($h_{+0.5}$ and $h_{+0.5}$) is not measured and is ignored because the effect of $h_{+0.5}$ and $h_{+0.5}$ on boundary value is cancelled or at least minimized by clock-recovery in a long term. Among the remaining terms, $h_{+1.5}$ has the primary effect, and the other terms have secondary effects. Since $h_{-1.5}$ is usually small, $E_{4.5}^{\{-1,+1,-1,+1,+1,-1,-1\}}$ is close to the value of $h_{+1.5}$, when the boundary values at $h_{+2.5}$ and later are minimized by the LE. In order to measure the optimal value of $h_{-1.5}$ with the optimal LE parameter which minimizes the boundary values at $h_{+2.5}$ and later, using $E_{4.5}^{\{-1,+1,-1,+1,+1,-1,-1\}}$ instead of using two data sequences to detect $h_{-1.5}$ may be advantageous, for example, because $E_{4.5}^{\{-1,+1,-1,+1,+1,-1,-1\}}$ is still close to the optimal value of $h_{-1.5}$ even if the LE parameter is not optimal and the terms on and after $h_{+2.5}$ are not fully minimized by LE. In particular embodiments, the current value of $h_{-1.5}$ may be largely affected by the LE parameter. For example, in $E_{4.5}^{\{-1,+1,-1,+1,+1,-1,-1\}}$, $h_{+1.5}$ and $h_{+3.5}$ are positive and $h_{+2.5}$ and $h_{+4.5}$ are negative, and the effect of LE parameter change is cancelled between these terms. In particular embodiments, DFE FB coefficient control may be less affected by LE parameter control where $E_{4.5}^{\{-1,+1,-1,+1,+1,-1,-1\}}$ is used to control a DFE FB coefficient than where $h_{-1.5}$ is used to control the DFE FB coefficient. For example, DFE FB coefficient control may be less affected by LE parameter control where two control loops are decoupled or orthogonalized with each other than where two control loops are coupled with each other. In particular embodiments, independent controls of the DFE FB coefficient and the LE parameter are more advantageous regarding to the convergence speed and the control loop stability than dependent controls of the DFE FB coefficient and the LE parameter. It may also be advantageous when various types of data sequences are not observed during adaptation period because it uses a lower number of data patterns.

FIG. 15 illustrates example sets of data sequences (or patterns) for detecting an individual residual boundary ISI component. In particular embodiments, it may be advantageous to switch between more than one set of data patterns which detect the same one or more components of residual ISI. Those multiple sets may be used in sequence or in random order. For example, the residual ISI of $h_{+2.5}$ may be detected by either set of data patterns shown in FIG. 15. In the illustrated embodiment, all values are inverted between pattern set R and pattern set F. In particular embodiments, using pattern set R and F alternatively or randomly reduces the effect of residual offset on residual ISI detection. In particular embodiments, it may be also advantageous to switch between one set of data patterns starting at an even bit and another set of data patterns starting at an odd bit. In particular embodiments, balancing the use of data patterns starting at an even bit and data patterns starting at an odd bit reduces the effect of duty-cycle distortion on residual ISI detection. In particular embodiments, when detecting an individual residual ISI component using two data patterns, steps may be taken to balance the number of operations between residual ISI components (and optionally between equalizer control variables).

Figure 16:
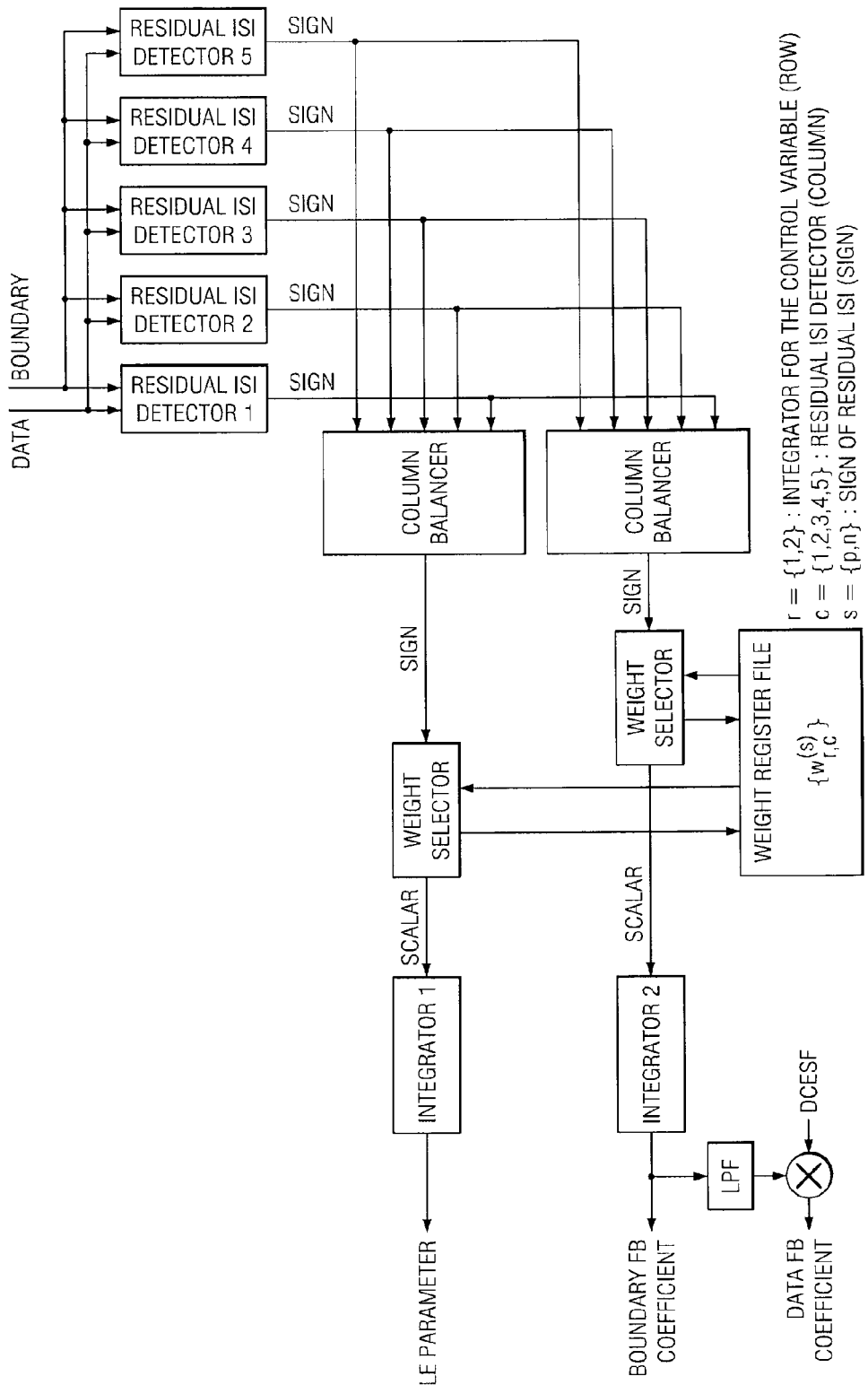
FIG. 16 illustrates example equalizer-control logic using an example sign-based method.

FIG. 16 illustrates example equalizer-control logic using an example sign-based method. The example equalizer-control logic uses a sign-based method to implement a modified General Zero-Forcing or Gauss-Newton algorithm that realizes the same or similar results. In particular embodiments, the sign-based method of FIG. 16 is configured to achieve statistically equivalent results to the results of the General Zero-Forcing or Gauss-Newton algorithm in a long term. The description above with respect to FIG. 3 further describes equalizer-control logic using a conventional General Zero-Forcing method for adaptive equalizer control and an example sign-based General Zero-Forcing method for adaptive equalizer control. The sign-based method does not measure the quantity of residual ISI. The sign-based method uses sign of residual ISI in a binary form and performs scalar and arithmetic operations instead of matrix multiply and vector operations. Residual ISI detectors 1 through 5 detect sign of residual ISI using the sign-based method. Residual ISI detectors 1 through 5 may switch between multiple sets of data patterns. Each residual ISI detector may be programmed to detect residual ISI using any data patterns, data sequences or sets of data patterns or data sequences in any format. Each residual ISI detector may utilize and switch between any interface modes and applications of adaptive control actions and operate during and switch between any periods of operation, such as during initialization, after initialization, and in use, because there may be different requirements such as available data patterns for adaptation and desired (or required) level of optimization. The sign-based method is more efficient and requires less hardware than adaptive control using conventional General Zero-Forcing or Gauss-Newton algorithms that measure quantity of residual ISI and perform matrix multiplication and vector operations. The sign-based method adds or subtracts weight to the control variable depending on the sign of residual ISI. In the sign-based method, magnitude of $W^{(P)}$ and $W^{(n)}$ are equivalent, and thus particular embodiments of the sign-based method do not use a target ISI vector. In particular embodiments, weight may be calculated from a derivative of the average of the binary residual ISI for the worst-case channel with respect to the equalizer control variable. In particular embodiments, the sign-based method balances the number of operations between residual ISI components (and optionally between equalizer control variables). In particular embodiments, the sign-based method may be implemented by any equalizer, including any two-dimensional equalizer, any DFE and any LE, such as a continuous-time linear equalizer (CTLE) for any equalizer parameter.

Figure 17:
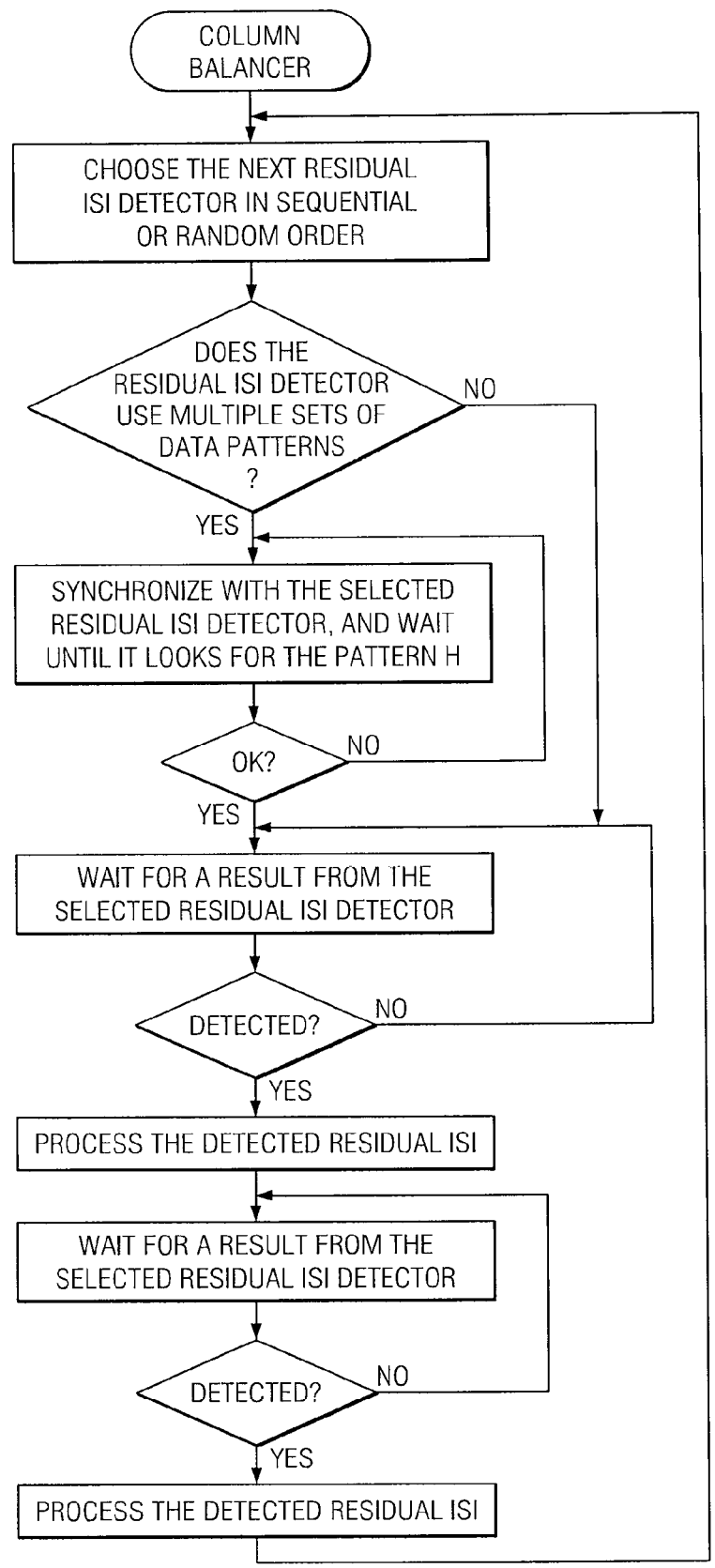
FIG. 17 illustrates example operation of an example column balancer.

FIG. 17 illustrates example operation of an example column balancer. The column balancer selects one residual ISI detector at a time, and processes two results (i.e., one for data pattern H and another for data pattern L in FIG. 10) from the selected residual ISI detector. If the residual ISI detector uses multiple sets of data patterns, it first synchronizes with the residual ISI detector after selection of the residual ISI detector so that the two results being processed are for the same set of data patterns. Synchronization may be done by waiting until the residual ISI detector is looking for the data pattern H (the first data pattern). After the column balancer processes two results from the selected residual ISI detector, the column balancer selects a next residual ISI detector in sequence or at random. In particular embodiments, in a long term, the column balancer guarantees that results from each residual ISI detector are taken into account for the same number of times. This is guaranteed for any incoming data sequence, even if data patterns for one residual ISI detector are quite often, whereas data patterns for another residual ISI detector are very rare.

As illustrated in FIG. 16, in particular embodiments, when a residual ISI detector selected by the column balancer detects residual ISI, the weight selector reads out a weight value from a three dimensional weight register file indexed by the integrator (row), the residual ISI detector (column), and the sign of detected residual ISI (sign). Then, the weight value is integrated to generate the value of the control variable, which is either the LE parameter or the boundary FB coefficient. The weight register file may be programmed to contain information equivalent to the adaptation matrix and the target ISI vector, of which FIG. 3 illustrates examples. In particular embodiments, an adaptation matrix M and an optional target ISI vector v may be defined in FIG. 3 as follows:

$$M = \begin{Bmatrix} m_{1,1} & m_{1,2} & m_{1,3} & m_{1,4} & m_{1,5} \\ m_{2,1} & m_{2,2} & m_{2,3} & m_{2,4} & m_{2,5} \end{Bmatrix}$$

$$v = \{ v_1 \quad v_2 \quad v_3 \quad v_4 \quad v_5 \}^t$$

To generate results that are equivalent to those generated using the adaptation matrix M and the optional target ISI vector v in FIG. 3, the three dimensional weight register file indexed by the integrator (row), the residual ISI detector (column), and the sign of detected residual ISI (sign) in FIG. 16 may be programmed as follows:

$$W^{(p)} = \begin{Bmatrix} w^{(p)}_{1,1} & w^{(p)}_{1,2} & w^{(p)}_{1,3} & w^{(p)}_{1,4} & w^{(p)}_{1,5} \\ w^{(p)}_{2,1} & w^{(p)}_{2,2} & w^{(p)}_{2,3} & w^{(p)}_{2,4} & w^{(p)}_{2,5} \end{Bmatrix}$$

$$W^{(n)} = \begin{Bmatrix} w^{(n)}_{1,1} & w^{(n)}_{1,2} & w^{(n)}_{1,3} & w^{(n)}_{1,4} & w^{(n)}_{1,5} \\ w^{(n)}_{2,1} & w^{(n)}_{2,2} & w^{(n)}_{2,3} & w^{(n)}_{2,4} & w^{(n)}_{2,5} \end{Bmatrix}$$

$$w^{(p)}_{r,c} = +K \times m_{r,c} \times (1 - v_c)$$

$$w^{(n)}_{r,c} = -K \times m_{r,c} \times (1 + v_c)$$

In this example, $W^{(p)}$ is the weight matrix for positive residual ISI, $W^{(n)}$ is the weight matrix for negative residual ISI, and K is an arbitrary small positive number ($0<K\ll1$).

The following shows how these are equivalent. First, assume that a residual ISI detector c generates $N_c^{(p)}$ positive results and $N_c^{(n)}$ negative results in N times of residual ISI detection by the residual ISI detector c. In particular embodiments, N is a large positive integer.

$$N_c^{(p)} + N_c^{(n)} = N$$

Then, the residual ISI vector q of which an example is illustrated in FIG. 3 is expressed as follows:

$$q = \{ q_1 \quad q_2 \quad q_3 \quad q_4 \quad q_5 \}^t$$

$$q_c = \frac{N_c^{(p)} - N_c^{(n)}}{N}$$

The error vector e and the update vector u in FIG. 3 may be expressed, for example, as follows:

$$e = \{ e_1 \quad e_2 \quad e_3 \quad e_4 \quad e_5 \}^t$$
$$= q - v$$
$$e_c = q_c - v_c$$
$$= \frac{N_c^{(p)} - N_c^{(n)}}{N} - v_c$$
$$u = \{ u_1 \quad u_2 \}^t$$
$$= M \times e$$
$$= M \times (q - v)$$
$$u_r = \sum_{c=1}^{5} m_{r,c} \times e_c$$
$$= \sum_{c=1}^{5} m_{r,c} \times \left( \frac{N_c^{(p)} - N_c^{(n)}}{N} - v_c \right)$$

The cumulative sum of weights for the integrator r in FIG. 16 while N results are processed for each residual ISI detector may be expressed, for example, as:

$$\hat{u}_r = \sum_{c=1}^{5} w_{r,c}^{(p)} \times N_c^{(p)} + w_{r,c}^{(p)} \times N_c^{(n)}$$

$$= \sum_{c=1}^{5} K \times m_{r,c} \times \{(1 - v_c) \times N_c^{(p)} - (1 + v_c) \times N_c^{(n)}\}$$

$$= \sum_{c=1}^{5} K \times m_{r,c} \times \{N_c^{(p)} - N_c^{(n)} - v_c \times (N_c^{(p)} + N_c^{(n)})\}$$

$$= \sum_{c=1}^{5} K \times m_{r,c} \times \{N_c^{(p)} - N_c^{(n)} - v_c \times N\}$$

$$= KN \sum_{c=1}^{5} m_{r,c} \times \left( \frac{N_c^{(p)} - N_c^{(n)}}{N} - v_c \right)$$

$$= KN \times u_r$$

These two systems are equivalent when $$N = \frac{1}{K}.$$

Since K is a small positive number, a large number N which makes two systems statistically equivalent exists.

In particular embodiments, the target ISI vector v is zero and not used, meaning that $W^{(p)} = -W^{(n)}$ and the difference between these weight matrices is zero and need not be recorded. The amount of hardware may be reduced, for example, by using a 2-dimensional weight register file which holds a value of $W = W^{(p)} = -W^{(n)}$, and selecting addition or subtraction by the sign of detected residual ISI. Weight may be calculated from a derivative of the average of the binary residual ISI for the worst-case channel with respect to the equalizer control variable. In particular embodiments, the sign-based method balances the number of operations between residual ISI components (and optionally between equalizer control variables).

In particular embodiments, $W^{(p)}$ and $W^{(n)}$ have different magnitudes and the magnitudes may be recorded in a 3-dimensional register file in order to implement the optional target ISI vector v. First, an optional target ISI vector v may be selected based on the average of the binary observation variable in the target state for the worst case. Second, an adaptation matrix M may be calculated from a derivative of the average of the binary observation variable with respect to the control variable in the target state for the worst case. Third, weight matrices of $W^{(p)}$ and $W^{(n)}$ may be calculated from the optional target ISI vector v and the adaptation matrix M with a small loop constant K according to the above formulas. These parameters minimizes squares of difference between the average of the binary observation variable and the optional target ISI vector in the equilibrium state for the worst case.

In particular embodiments, the amount of increase (or decrease) applied to a binary observation variable is equivalent, and the average of a particular binary observation variable is zero in the equilibrium state. U.S. Patent Application Publication No. 2007/0280389, entitled System and Method for Asymmetrically Adjusting Compensation Applied to a Signal and published 6 Dec. 2007, which is incorporated herein by reference, discloses changing the equilibrium state from such a state to a next state where the average of the binary observation variable is a non-zero target value. For example, where there is a single control variable and a single binary observation variable and amount of increase and decrease of the control variable according to the binary observation variable is different, the average of the binary observation variable always converges to the non-zero target value in the equilibrium state.

In particular embodiments, where there are single or multiple control variables and multiple binary observation variables, the number of binary observation variables is larger than the number of control variables. In particular embodiments, where the amount of increase and decrease is equivalent, the sum of the squares of the average of each binary observation variable is minimized in the equilibrium state for a certain condition. In particular embodiments, where the amount of increase and decrease is different, the equilibrium state is changed from such a state to a next state where the sum of the squares of the difference between the average of each binary observation variable and a target value of the observation variable is minimized for the certain condition. Particular embodiments including single or multiple equalizer control variables and multiple binary observation variables balance the number of operations between binary observation variables (and optionally between equalizer control variables). Herein, reference to "equalizer control variables" may encompass equalizer parameters, and vice versa, where appropriate.

Figure 18:
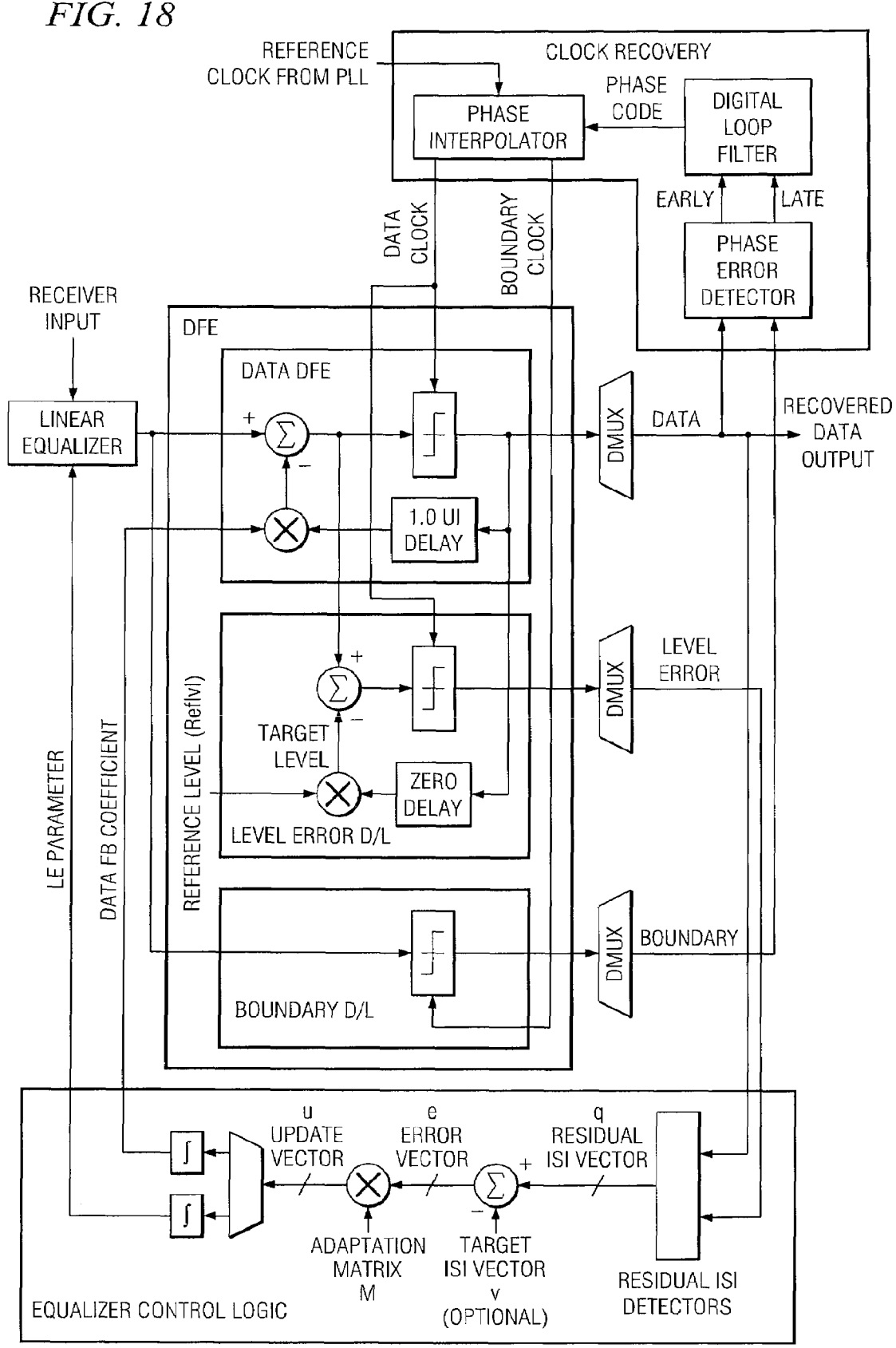
FIG. 18 illustrates example adaptive equalizer control based on example level error.

FIG. 18 illustrates example adaptive equalizer control based on example level error. Amplitude error ("reference-level error" or "level-error") is used instead of the boundary value for adaptive control. The level-error decision latch (D/L) subtracts a target level, which is the product of a data value and a reference level from the pre-decision level of the data DFE, and produces a sign of level-error, either +1 or −1. In particular embodiments, the level-error D/L may use a speculative or loop-unrolling technique similar to FIG. 5, for example, to solve the timing constraint. In particular embodiments, the level-error D/L uses a time multiplexing technique to decrease hardware resources, which may be increased by unrolling feedback loops.

Figure 19:
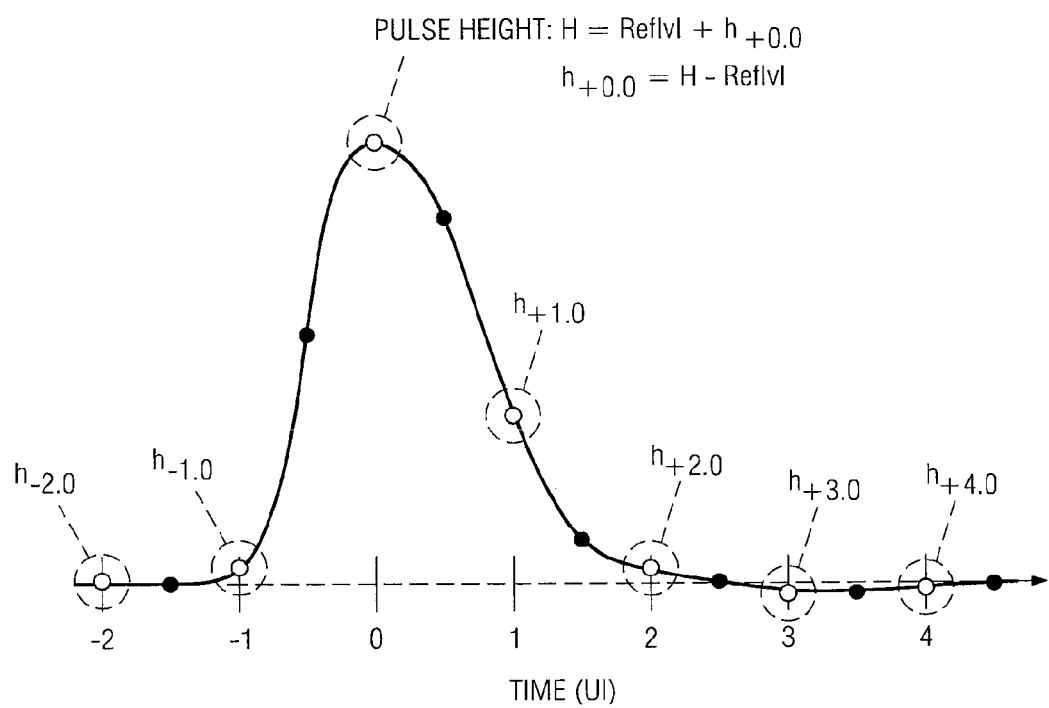
FIG. 19 illustrates example residual data ISI in an example pulse response at an output of an example LE.
Figure 20:
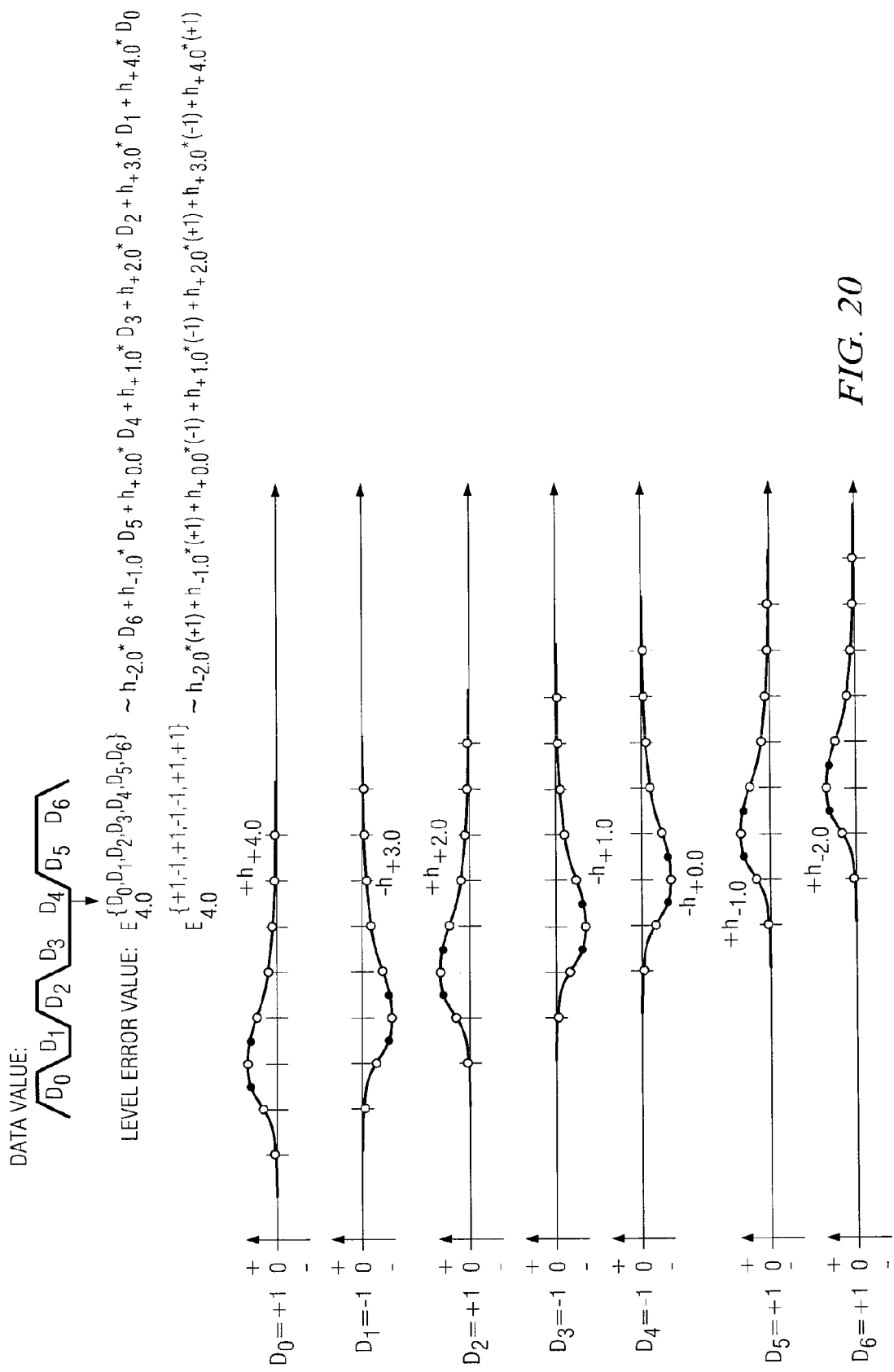
FIG. 20 illustrates example convolution of example residual data ISI and an example data sequence.

FIG. 19 illustrates example residual data ISI in an example pulse response at an output of an example LE. The residual data ISI at time zero ($h_{+0,0}$) represents the difference of the pulse height at time zero (H) and the reference level (Reflvl). At all other times, for example, at the other times illustrated, the residual data ISI is the same as the pulse response level. As described with respect to FIG. 8, a boundary value may be represented as a convolution of residual boundary ISI and a data sequence. Similarly, a data value may be represented as a convolution of residual data ISI and a data sequence. FIG. 20 illustrates example convolution of example residual data ISI and an example data sequence. In particular embodiments, when receiving a continuous data sequence, level-error seen by the decision circuit in the level-error D/L is represented as a convolution of residual data ISI and the data sequence as shown in FIG. 20.

Figure 21:
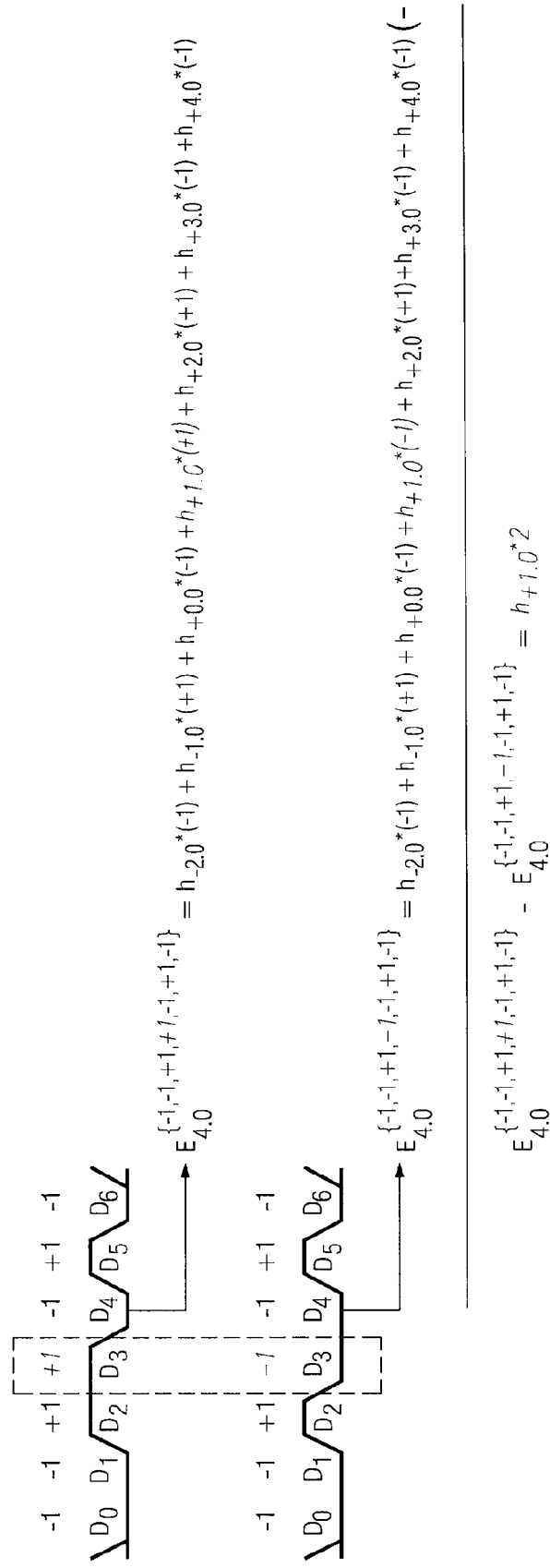
FIG. 21 illustrates example detection of residual data ISI based on one or more differences in level-error values between two data sequences.

FIG. 21 illustrates example detection of residual data ISI based on one or more differences in level-error values between two data sequences. As illustrated, $h_{+1,0}$ is measured by taking a difference in the level-error values at $D_4$ for two data sequences which have different values at $D_3$. Residual data ISI may be measured by taking a difference in the level-error values for two data sequences which have different values in the data bits corresponding to the residual data ISI to be measured. While level-error values may be measured as full-range precision analog level, the illustrated embodiment may be used to measure residual data ISI, including the sign and magnitude to some extent of the residual data ISI, using only binary level-error values, either +1 or −1, instead of precision analog levels. The statistical difference between the binary level-error values for the two data sequences may be used to measure the sign and magnitude to some extent of the residual data ISI as long as the binary level-error values are not statistically saturated. For example, the probabilities of positive ("+1") level-error values are exactly same for the two data sequence in FIG. 21, if and only if the residual data ISI $h_{+1,0}$ is absolutely zero. As another example, the probabilities of negative ("−1") level-error values are exactly same for the two data sequence in FIG. 21, if and only if the residual data ISI $h_{+1,0}$ is absolutely zero. If the residual data ISI at $h_{+1,0}$ is not zero, the probability of positive (or negative) level-error value is higher (or lower) for the data sequence with $D_3=+1$ than $D_3=-1$, depending on whether the residual data ISI $h_{+0,0}$ is positive or negative. The amount of statistical difference indicates the magnitude of the residual data ISI $h_{+1,0}$.

The detection of residual boundary ISI as described and illustrated by the present disclosure with respect to particular embodiments may be applicable to detecting residual data ISI or level-error values, where appropriate. The detection of residual data ISI or level-error values as described and illustrated by the present disclosure with respect to particular embodiments may be applicable to detecting residual boundary ISI. Although the present disclosure describes two-dimensional control for one parameter LE and one tap DFE, the present disclosure contemplates any suitable adaptive control of any suitable number of any suitable parameters of (for example) continuous-time LEs, multi-tap DFEs or multi-tap FIR filters, or pre-emphasis parameters using multi-tap FIR filters.

An adaptive equalizer control system may include any suitable type of memory. The memory may be used to store phase delay settings, phase codes, target level-error values, target residual boundary and data ISI values, adaptation matrix, rows, columns, signs, parameters, input signals, output signals. Such values may correspond to user or administrator specified values that may be entered into a database that may be accessed by the memory.

As an example and not by way of limitation, an adaptive equalizer control system may provide functionality as a result of a processor executing software embodied in one or more tangible, computer-readable media, such as a memory. A computer-readable medium may include one or more memory devices, according to particular needs. Main memory may read the software from one or more other computer-readable media, such as mass storage device or from one or more other sources via communication interface. The software may cause processor to execute particular processes or particular steps of particular processes described herein. In addition or as an alternative, the computer system may provide functionality as a result of logic hardwired or otherwise embodied in a circuit, which may operate in place of or together with software to execute particular processes or particular steps of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

Figure 22:
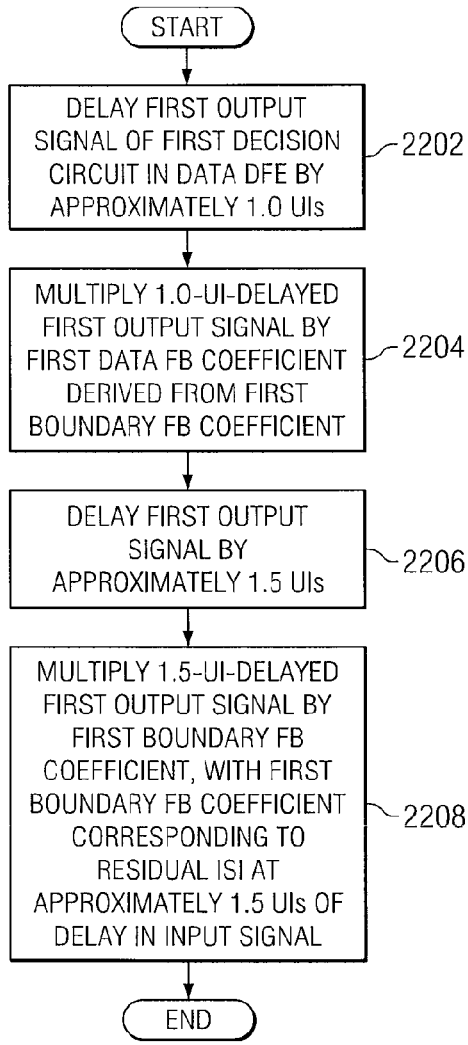
FIG. 22 illustrates an example method for adaptive control of a DFE.

FIG. 22 illustrates an example method for adaptive control of a DFE. The method begins at step 2202, where a first one of one or more data FB taps in a data DFE delays a first output signal of a first decision circuit in the data DFE by approximately 1.0 unit intervals (UIs). The first output signal includes data values recovered by the first decision circuit from an input signal from a receiver. At step 2204, the first one of data FB taps multiplies the 1.0-UI-delayed first output signal by a first data FB coefficient derived from a first boundary FB coefficient. At step 2206, a first one of one or more boundary FB taps in a boundary DFE delays the first output signal by approximately 1.5 UIs. At step 2208, the first one of the boundary FB taps multiplies the 1.5-UI-delayed first output signal by the first boundary FB coefficient, with the first boundary FB coefficient corresponding to residual intersymbol interference (ISI) at approximately 1.5 UIs of delay in the input signal, at which point the method ends. Particular embodiments may continuously repeat the steps of the method of FIG. 22, according to particular needs. Although the present disclosure describes and illustrates particular steps of the method of FIG. 22 as occurring in a particular order, the present disclosure contemplates any suitable steps of the method of FIG. 22 occurring in any suitable order. Although the present disclosure describes and illustrates particular components carrying out particular steps of the method of FIG. 22, the present disclosure contemplates any suitable components carrying out any suitable steps of the method of FIG. 22.

Figure 23:
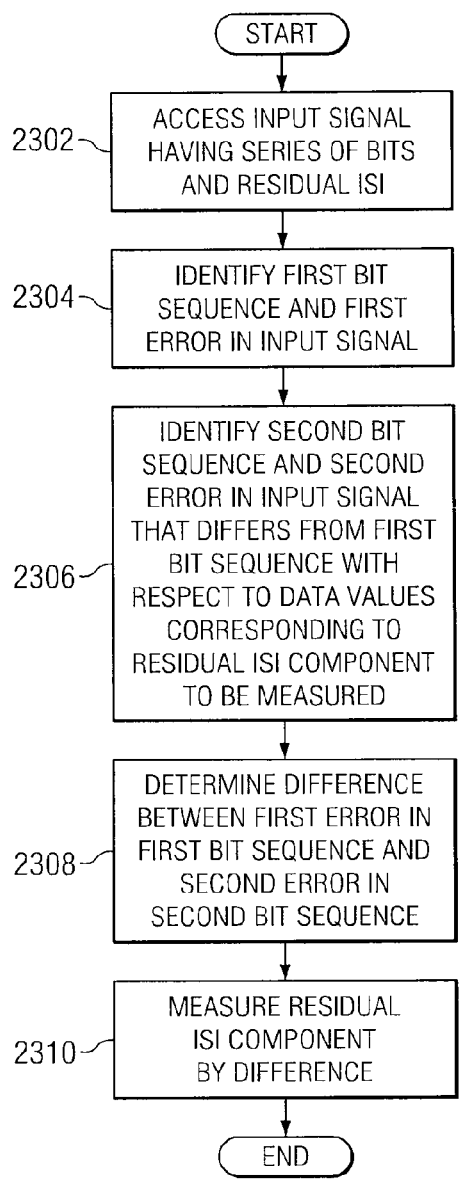
FIG. 23 illustrates an example method for detecting residual ISI components using two data patterns.

FIG. 23 illustrates an example method 2300 for detecting residual ISI components using two data patterns. The method begins at step 2302, where one or more circuit components access an input signal from a receiver. In particular embodiments, the input signal includes a series of bits and residual ISI. At step 2304, the circuit components identify a first bit sequence and a first error associated with the first bit sequence in the input signal. At step 2306, the circuit components identify a second bit sequence and a second error associated with the second bit sequence in the input signal that differs from the first bit sequence with respect to one or more data values of one or more bits in the first and second bit sequences. The one or more data values correspond to particular residual ISI for measurement. At step 2308, the circuit components determine a difference between the first error associated with the first bit sequence and the second error associated with the second bit sequence. At step 2310, the circuit components measure the particular residual ISI by the difference, at which point the method ends. Particular embodiments use the particular residual ISI measurement for adaptive equalizer control. Particular embodiments may continuously repeat the steps of the method of FIG. 23, according to particular needs. Although the present disclosure describes and illustrates particular steps of the method of FIG. 23 as occurring in a particular order, the present disclosure contemplates any suitable steps of the method of FIG. 23 occurring in any suitable order. Although the present disclosure describes and illustrates particular components carrying out particular steps of the method of FIG. 23, the present disclosure contemplates any suitable components carrying out any suitable steps of the method of FIG. 23.

Figure 24:
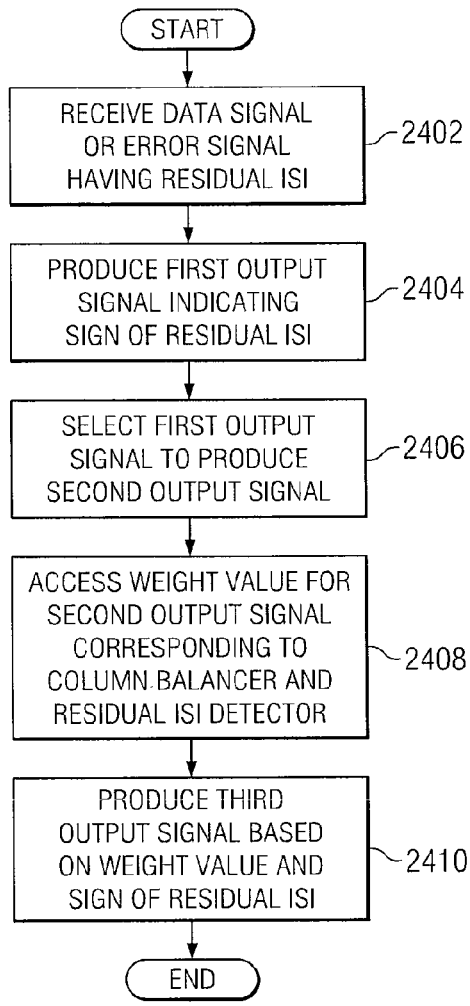
FIG. 24 illustrates an example method for sign-based general zero-forcing adaptive equalizer control.

FIG. 24 illustrates an example method for sign-based general zero-forcing adaptive equalizer control. The method begins at step 2402, where one or more residual ISI detectors receive from a DFE a data signal or an error signal comprising residual ISI. At step 2404, the residual ISI detector produces a first output signal indicating whether the residual ISI has a positive sign or a negative sign. At step 2406, one or more column balancers select from among the first output signals one of the first output signals to produce a second output signal. At step 2408, one or more weight selectors access from among multiple weight values one of the weight values for a received one of the second output signals. The accessed one of the weight values corresponds to the column balancer that produced the second output signal and the residual ISI detector that produced the selected one of the first output signals to produce the second output signal. The accessed one of the weight values has a magnitude that is substantially independent of the sign of the residual ISI indicated by the selected one of the first output signals to produce the second output signal. At step 2410, the weight selector produces a third output signal based on the accessed one of the weight values and the sign of the residual ISI indicated by the selected one of the first output signals, at which point the method ends. Particular embodiments use the third signal to produce one or more fourth output signals representing one or more control variables for one or more equalizers. Particular embodiments may continuously repeat the steps of the method of FIG. 24, according to particular needs. Although the present disclosure describes and illustrates particular steps of the method of FIG. 24 as occurring in a particular order, the present disclosure contemplates any suitable steps of the method of FIG. 24 occurring in any suitable order. Although the present disclosure describes and illustrates particular components carrying out particular steps of the method of FIG. 24, the present disclosure contemplates any suitable components carrying out any suitable steps of the method of FIG. 24.

Figure 25:
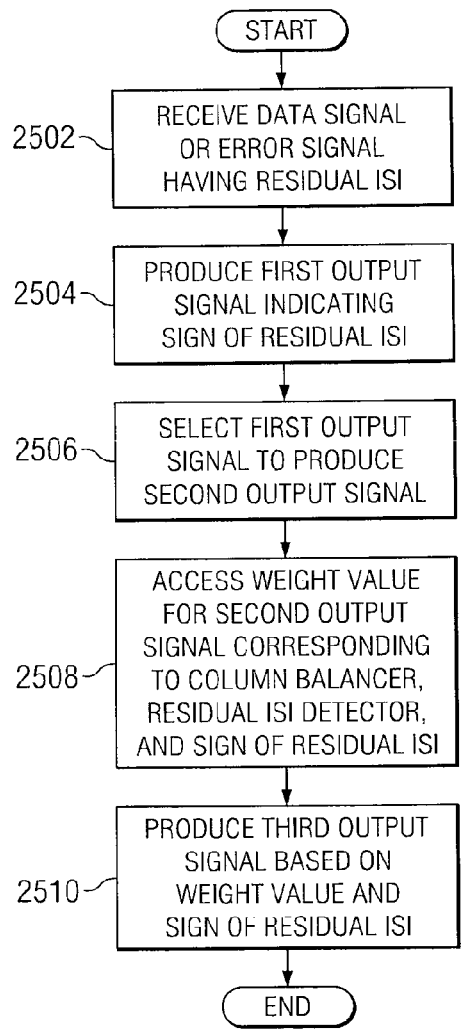
FIG. 25 illustrates an example method for multidimensional asymmetric bang-bang control.

FIG. 25 illustrates an example method for multidimensional asymmetric bang-bang control. The method begins at step 2502, where one or more residual ISI detectors receive from a DFE a data signal or an error signal comprising residual ISI. At step 2504, the one or more residual ISI detectors produce a first output signal indicating whether the residual ISI has a positive sign or a negative sign. At step 2506, the one or more column balancers select from among the first output signals one of the first output signals to produce a second output signal. At step 2508, one or more weight selectors access from among multiple weight values one of the weight values for a received one of the second output signals. The accessed one of the weight values corresponds to the column balancer that produced the second output signal, the residual ISI detector that produced the selected one of the first output signals to produce the second output signal, and the sign of the residual ISI indicated by the selected one of the first output signals to produce the second output signal. The accessed one of the weight values has a magnitude that depends on the sign of the residual ISI indicated by the selected one of the first output signals to produce the second output signal. At step 2510, the weight selector produces a third output signal based on the accessed one of the weight values, at which point the method ends. Particular embodiments use the third signal to produce one or more fourth output signals representing one or more control variables for one or more equalizers. Particular embodiments may continuously repeat the steps of the method of FIG. 25, according to particular needs. Although the present disclosure describes and illustrates particular steps of the method of FIG. 25 as occurring in a particular order, the present disclosure contemplates any suitable steps of the method of FIG. 25 occurring in any suitable order. Although the present disclosure describes and illustrates particular components carrying out particular steps of the method of FIG. 25, the present disclosure contemplates any suitable components carrying out any suitable steps of the method of FIG. 25.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed:

1. A system comprising:
one or more residual intersymbol interference (ISI) detectors that are each configured to receive from a decision feedback equalizer (DFE) a data signal or an error signal comprising residual ISI and produce a first output signal indicating whether the residual ISI has a positive sign or a negative sign;
one or more column balancers that are each configured to receive, from one or more of the ISI residual detectors, respective first output signals and select one of the received first output signals to produce a second output signal; and
one or more weight selectors that are each configured to:
receive, from a particular one of the one or more column balancers, a respective second output signal;
access from among a plurality of weight values one of the weight values for the received second output signal, the accessed one of the weight values:
corresponding to the particular one column balancer; and the residual ISI detector that produced the selected first output signal to produce the received second output signal; and
having a magnitude that is substantially independent of the sign of the residual ISI indicated by the selected first output signal to produce the received second output signal; and
produce a third output signal based on the accessed one of the weight values and the sign of the residual ISI indicated by the selected first output signal to produce the received second output signal, the third signal being usable in producing one or more fourth output signals representing one or more control variables for one or more equalizers.

2. The system of claim 1, wherein the plurality of weight values reside in a two-dimensional weight register file, the plurality of weight values being indexed by column balancer and residual ISI detector.

3. The system of claim 1, wherein an integrator is used for each of the third output signals to produce the corresponding fourth output signal by integrating the third output signal.

4. The system of claim 1, wherein a probability of the column balancer selecting any one of the received first output signals is equal to a probability of the column balancer selecting any other one of the received first output signals to produce the second output signal.

5. The system of claim 4, wherein the column balancer is configured to select from among the received first output signals randomly.

6. The system of claim 4, wherein the column balancer is configured to select from among the received first output signals sequentially.

7. The system of claim 4, wherein the column balancer is configured to select a same one of the received first output signals twice in a row.

8. The system of claim 1, wherein the accessed one of the weight values is calculated from a derivative of an average of residual ISI in a worst-case transmission channel with respect to one or more of the control variables for one or more of the equalizers.

9. The system of claim 1, wherein:
there are two weight selectors;
the third output signal of a first one of the weight selectors is for use in producing a linear equalizer (LE) parameter signal; and
the third output signal of a second one of the weight selectors is for use in producing a boundary feedback (FB) coefficient signal and a data FB coefficient signal for the DFE.

10. The system of claim 1, wherein the data FB coefficient is derived from the boundary FB coefficient using a scaling factor.

11. The system of claim 1, wherein different ones of the residual ISI detectors use different bit patterns or different schemes to detect the residual ISI.

12. The system of claim 1, where the residual ISI detectors are programmable.

13. The system of claim 1, wherein functions of a plurality of the residual ISI detectors are implemented using one multiplexed residual ISI detector to produce the first output signals.

14. The system of claim 1, wherein functions of a plurality of the column balancers are implemented using one multiplexed column balancer to produce the second output signals.

15. The system of claim 1, wherein functions of a plurality of the weight selectors are implemented using one multiplexed weight selector to produce the third output signals.

16. The system of claim 1, wherein functions of the column balancer and a corresponding one of the weight selectors are implemented together.

17. The system of claim 1, wherein functions of a plurality of the residual ISI detectors and a plurality of the column balancers are implemented together.

18. A method comprising:
by each of one or more residual intersymbol interference (ISI) detectors:
receiving from a decision feedback equalizer (DFE) a data signal or an error signal comprising residual ISI; and
producing a first output signal indicating whether the residual ISI has a positive sign or a negative sign;
by each of one or more column balancers:
receiving, from one or more of the ISI residual detectors, respective first output signals; and
selecting one of the received first output signals to produce a second output signal;
by each of one or more weight selectors:
receiving, from a particular one of the one or more column balancers, a respective second output signal;
accessing from among a plurality of weight values one of the weight values for the received second output signal, the accessed one of the weight values:
corresponding to the particular one column balancer and the residual ISI detector that produced the selected first output signal to produce the received second output signal; and
having a magnitude that is substantially independent of the sign of the residual ISI indicated by the selected first output signal to produce the received second output signal; and
producing a third output signal based on the accessed one of the weight values and the sign of the residual ISI indicated by the selected first output signal to produce the received second output signal, the third signal being usable in producing one or more fourth output signals representing one or more control variables for one or more equalizers.

19. A system comprising:
means for producing one or more first output signals, each first output signal indicating whether a corresponding residual intersymbol interference (ISI) has a positive sign or a negative sign;
means for selecting one of the one or more first output signals to produce a second output signal;
means for accessing from among a plurality of weight values one of the weight values for the second output signal, the accessed one of the weight values:
corresponding to means for selecting one of the one or more first output signals to produce the second output signal; and
having a magnitude that is substantially independent of the sign of the residual ISI indicated by the selected first output signal to produce the second output signal; and
means for producing a third output signal based on the accessed one of the weight values and the sign of the residual ISI indicated by the selected first output signal to produce the second output signal, the third signal being usable in producing one or more fourth output signals representing one or more control variables for one or more equalizers.

* * * * *